(12) United States Patent
Cech et al.

(10) Patent No.: US 7,463,987 B2
(45) Date of Patent: Dec. 9, 2008

(54) MAGNETIC SENSING SYSTEM AND METHOD

(75) Inventors: Leonard S. Cech, Brighton, MI (US); Timothy J. Bomya, Westland, MI (US); James Gregory Stanley, Novi, MI (US)

(73) Assignee: Takata Holdings, Inc., Farmington Hills, MI (US)

( * ) Notice: Subject to any disclaimer, the term of this patent is extended or adjusted under 35 U.S.C. 154(b) by 0 days.

(21) Appl. No.: 11/535,481

(22) Filed: Sep. 26, 2006

(65) Prior Publication Data

US 2007/0118312 A1 May 24, 2007
US 2007/0233407 A2 Oct. 4, 2007

Related U.S. Application Data

(63) Continuation-in-part of application No. 10/946,151, filed on Sep. 20, 2004, now Pat. No. 7,113,874, which is a continuation-in-part of application No. 10/905,219, filed on Dec. 21, 2004, now Pat. No. 7,212,895.

(60) Provisional application No. 60/481,821, filed on Dec. 21, 2003, provisional application No. 60/503,906, filed on Sep. 19, 2003.

(51) Int. Cl.
*G08B 19/00* (2006.01)

(52) U.S. Cl. ............ 702/65; 702/190; 340/573.1; 340/436; 340/547; 340/540; 280/735; 280/734; 307/10.1; 324/207.17

(58) Field of Classification Search ............ 702/65, 702/190; 324/251, 207.2, 207.13, 207.17, 324/228, 207.16; 340/573.1, 436, 547, 540; 280/734, 735; 307/10.1, 9.1; 73/862.69; 180/273
See application file for complete search history.

(56) References Cited

U.S. PATENT DOCUMENTS

| | | | |
|---|---|---|---|
| 2,552,722 A | 5/1951 | King | |
| 3,848,243 A | 11/1974 | Schirmer | |
| 3,870,948 A | 3/1975 | Holt et al. | |
| 3,945,459 A | 3/1976 | Oishi et al. | |
| 4,206,451 A | 6/1980 | Kurschner | |
| 4,300,116 A | 11/1981 | Stahovec | |
| 4,630,229 A | 12/1986 | D'Hondt | |
| 4,651,093 A | 3/1987 | Detriche' et al. | |
| 4,706,073 A | 11/1987 | Vila Masot | |
| 4,855,677 A | 8/1989 | Clark, Jr. et al. | |
| 4,893,077 A | 1/1990 | Auchterlonie | |
| 4,952,855 A | 8/1990 | Meins et al. | |
| 5,068,608 A | 11/1991 | Clark, Jr. | |
| 5,097,253 A | 3/1992 | Eschbach et al. | |
| 5,182,513 A | 1/1993 | Young et al. | |

(Continued)

FOREIGN PATENT DOCUMENTS

| | | |
|---|---|---|
| DE | 43 00 653 | 1/1992 |
| EP | 0 453 824 A1 | 10/1991 |
| EP | 0 453 824 B1 | 9/1994 |
| JP | 56-157802 A | 5/1981 |

OTHER PUBLICATIONS

Kwun, H., "Magnetostrictive Sensors Technology", reprinted from Technology Today, Mar. 1995, pp. 3-7, which includes "Back in Style: Magnetostrictive Sensors" reprinted from Sep. 1991.

(Continued)

*Primary Examiner*—Carol S Tsai
(74) *Attorney, Agent, or Firm*—Raggio & Dinnin, P.C.

(57) ABSTRACT

A coil at a first location in magnetic communication with a door of a vehicle generates a magnetic field responsive to a time varying signal applied thereto. The first location and the coil are adapted so that the magnetic field is influenced by an opening state of the door, and by a crash involving the door. A signal is generated from the coil responsive to the time-varying signal and to the magnetic field, wherein the signal provides for sensing an opening state of the door and for sensing a crash involving the door.

21 Claims, 14 Drawing Sheets

U.S. PATENT DOCUMENTS

| | | | |
|---|---|---|---|
| 5,399,968 | A | 3/1995 | Sheppard et al. |
| 5,525,907 | A | 6/1996 | Frazier |
| 5,559,431 | A | 9/1996 | Sellen |
| 5,580,084 | A | 12/1996 | Gioutsos |
| 5,583,435 | A | 12/1996 | Takemoto et al. |
| 5,610,583 | A * | 3/1997 | Drebika et al. .............. 340/566 |
| 5,629,619 | A | 5/1997 | Mednikov |
| 5,683,103 | A | 11/1997 | Blackburn et al. |
| 5,707,076 | A | 1/1998 | Takahashi |
| 5,739,757 | A | 4/1998 | Gioutsos |
| 5,747,696 | A | 5/1998 | Kwun et al. |
| 5,767,766 | A | 6/1998 | Kwun |
| 5,793,200 | A | 8/1998 | Berrill |
| 5,793,206 | A | 8/1998 | Goldfine et al. |
| 5,838,233 | A | 11/1998 | Hawes et al. |
| 5,892,443 | A * | 4/1999 | Friedrich .................... 340/540 |
| 5,895,439 | A | 4/1999 | Fisher et al. |
| 5,940,003 | A * | 8/1999 | Schulz ...................... 340/5.66 |
| 5,966,011 | A | 10/1999 | Goldfine et al. |
| RE36,427 | E | 12/1999 | Gioutsos |
| 5,985,392 | A | 12/1999 | Patzwaldt |
| 6,005,392 | A | 12/1999 | Patzwaldt |
| 6,018,980 | A | 2/2000 | Kimura et al. |
| 6,039,345 | A * | 3/2000 | Cech et al. .................. 280/735 |
| 6,060,969 | A * | 5/2000 | Hufgard et al. ............. 335/207 |
| 6,175,232 | B1 | 1/2001 | de Coulon et al. |
| 6,246,230 | B1 | 6/2001 | Mednikov |
| 6,317,048 | B1 | 11/2001 | Bomya et al. |
| 6,351,120 | B2 | 2/2002 | Goldfine |
| 6,366,200 | B1 | 4/2002 | Aoki |
| 6,396,262 | B2 | 5/2002 | Light et al. |
| 6,407,660 | B1 | 6/2002 | Bomya |
| 6,433,688 | B1 * | 8/2002 | Bomya .................... 340/573.1 |
| 6,462,535 | B1 | 10/2002 | Schwabe |
| 6,462,536 | B1 | 10/2002 | Mednikov et al. |
| 6,469,499 | B2 | 10/2002 | Delaporte |
| 6,476,605 | B1 | 11/2002 | de Coulon |
| 6,479,990 | B2 | 11/2002 | Mednikov et al. |
| 6,552,662 | B1 | 4/2003 | Bomya et al. |
| 6,583,616 | B1 * | 6/2003 | Bomya .................. 324/207.17 |
| 6,586,926 | B1 * | 7/2003 | Bomya .................. 324/207.17 |
| 6,587,048 | B1 | 7/2003 | Bomya |
| 6,631,776 | B1 | 10/2003 | Bomya |
| 6,644,688 | B1 | 11/2003 | Hu et al. |
| 6,710,599 | B2 * | 3/2004 | Bosnar ....................... 324/334 |
| 6,777,927 | B1 * | 8/2004 | Bomya .................. 324/207.17 |
| 6,812,697 | B2 | 11/2004 | McKnight et al. |
| 7,113,874 | B2 | 9/2006 | Watson et al. |
| 7,190,161 | B2 | 3/2007 | Bomya |
| 2001/0022266 | A1 * | 9/2001 | Benard ..................... 200/61.64 |
| 2002/0003421 | A1 | 1/2002 | Kawata et al. |
| 2002/0011217 | A1 | 1/2002 | Brooks |
| 2002/0126004 | A1 | 9/2002 | Gioutsos et al. |
| 2004/0061617 | A1 | 4/2004 | Gioutsos et al. |
| 2004/0075429 | A1 | 4/2004 | Hiroshima |
| 2004/0130315 | A1 | 7/2004 | Lamb et al. |
| 2005/0007108 | A1 | 1/2005 | Dogaru |
| 2005/0093540 | A1 | 5/2005 | Merrick et al. |
| 2005/0096815 | A1 | 5/2005 | Takafuji et al. |
| 2005/0127908 | A1 | 6/2005 | Schlicker et al. |
| 2005/0143944 | A1 | 6/2005 | Cech et al. |
| 2005/0154530 | A1 | 7/2005 | Hosokawa et al. |
| 2007/0024277 | A1 | 2/2007 | Cech et al. |

OTHER PUBLICATIONS

Uras, M. H., "Signal Detection Methods for Magnetostrictive Sensors", 970604, reprinted from Sensors and Actuators 1997, SP-1220, Society of Automotive Engineers, Feb. 24, 1997, pp. 23-33.

Buckley, J. M., "An Introduction to Eddy Current Testing theory and technology,", technical paper eddyc.pdf available from the internet at http://joe.buckley.net/papers, downloaded on Sep. 8, 2003.

NDT Resource Center, Internet web pages at http://www.ndt-ed.org/EducationResources/CommunityCollege/EddyCurrents/cc_ec_index.htm, NDT Resource Center, downloaded on Oct. 13, 2005.

* cited by examiner

US 7,463,987 B2

MAGNETIC SENSING SYSTEM AND METHOD

CROSS-REFERENCE TO RELATED APPLICATIONS

The instant application is a continuation-in-part of U.S. application Ser. No. 10/946,151 filed on Sep. 20, 2004, now U.S. Pat. No. 7,113,874, which claims the benefit of prior U.S. Provisional Application Ser. No. 60/503,906 filed on Sep. 19, 2003. The instant application is also a continuation-in-part of U.S. application Ser. No. 10/905,219 filed on Dec. 21, 2004 now U.S. Pat. No. 7,212,895, which claims the benefit of prior U.S. Provisional Application Ser. No. 60/481,821 filed on Dec. 21, 2003.

The instant application is also related in subject matter to U.S. application Ser. No. 11/530,492 filed on Sep. 11, 2006. Each of the above-identified applications is incorporated by reference in its entirety.

BRIEF DESCRIPTION OF THE DRAWINGS

In the accompanying drawings:

FIG. 18 illustrates a schematic block diagram of a ninth embodiment of a magnetic crash sensing system in a vehicle;

DESCRIPTION OF EMBODIMENT(S)

Figure 1:
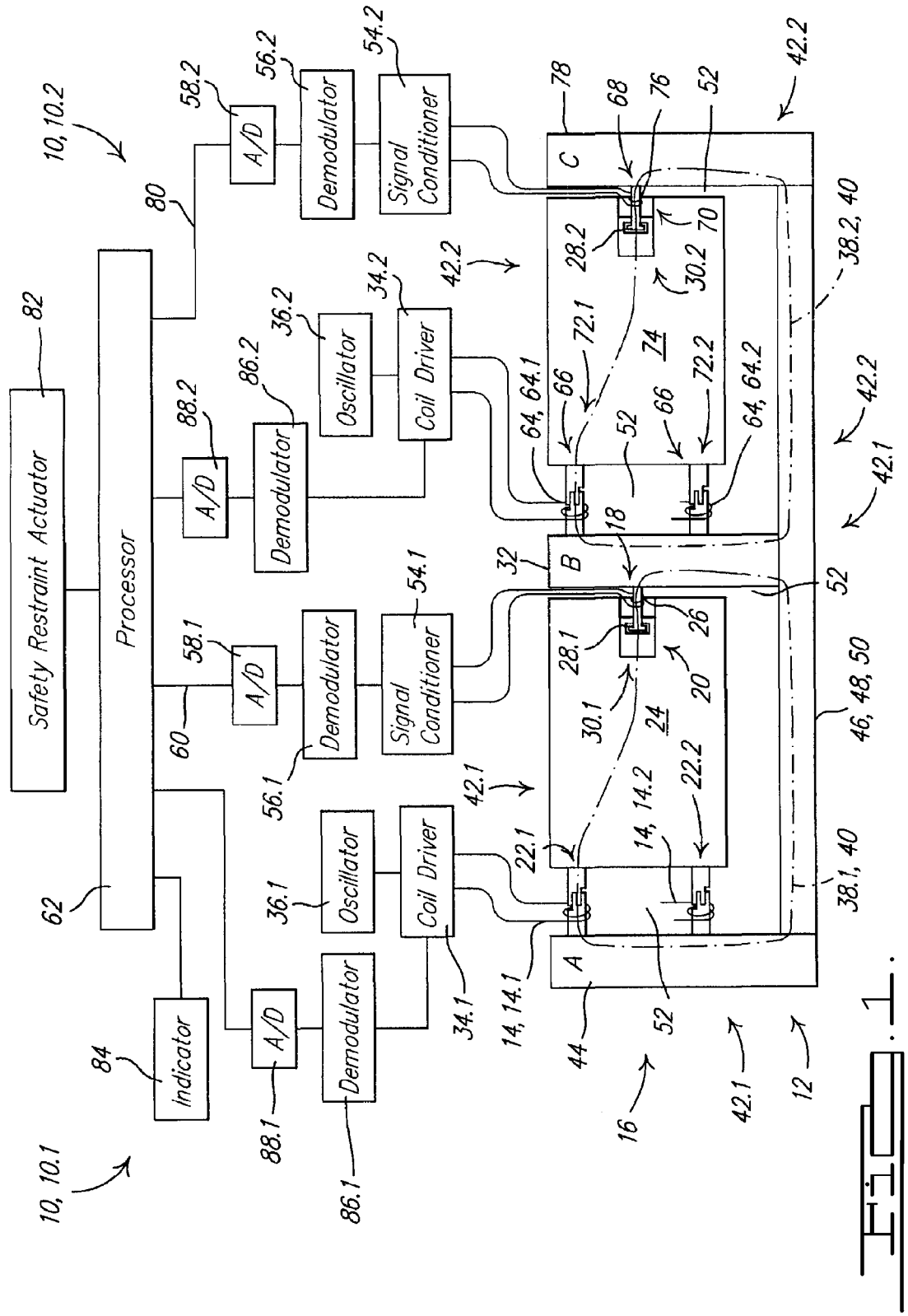
FIG. 1 illustrates a schematic block diagram of a magnetic crash sensor in a vehicle.

Referring to FIG. 1, a first magnetic crash sensor 10.1 incorporated in a vehicle 12 comprises at least one first coil 14 at a corresponding at least one first location 16 of the vehicle 12, and an associated at least one first magnetic sensor 18 at a corresponding at least one second location 20 of the vehicle 12. For example, in the embodiment illustrated in FIG. 1, a first coil 14 is located around an upper hinge 22.1 of a front door 24 of the vehicle 12, and the at least one first magnetic sensor 18 comprises a second coil 26 around the striker 28.1 of the door latch assembly 30.1 of the front door 24, wherein the striker 28.1 is operatively coupled to the B-pillar 32 of the vehicle 12 and the second coil 26 is proximate thereto. The at least one first coil 14 is operatively coupled to a first coil driver 34.1, which is in turn operatively coupled to a first oscillator 36.1, wherein an oscillatory signal from the first oscillator 36.1 is applied by the first coil driver 34.1 to cause an associated current in the at least one first coil 14, responsive to which the at least one first coil 14 generates a first magnetic field 38.1 comprising magnetic flux 40 in an associated first magnetic circuit 42.1 comprising the A-pillar 44, front door 24, B-pillar 32, and the body 46, frame 48 or powertrain 50 of the vehicle 12. The first oscillator 36.1 generates an oscillating signal, for example, having either a sinusoidal, square wave, triangular or other waveform shape, of a single frequency, or a plurality of frequencies that, for example, are either stepped, continuously swept or simultaneous. The frequency is adapted so that the resulting first magnetic field 38.1 is conducted through the first magnetic circuit 42.1 with sufficient strength so as to provide a useful signal level from the first magnetic sensor 18 that cooperates therewith. For example, the oscillation frequency would typically be less than about 100 KHz for a steel structure, e.g. 20 to 30 KHz in one embodiment. An oscillation frequency in the audio range, e.g. 10 to 20 KHz, can also be used for crash sensing, however, such frequencies may cause an audible hum to be generated by the associated magnetic circuit. The first magnetic field 38.1 is responsive to the reluctance R of the associated first magnetic circuit 42.1, which is affected by a crash involving the elements thereof and/or the gaps 52 therein. The first magnetic field 38.1 is sensed by the at least one first magnetic sensor 18, and the signal therefrom is conditioned by an associated first signal conditioner 54.1, demodulated by a first demodulator 56.1, converted from analog to digital form by a first analog-to-digital converter 58.1, and input as a first magnetic sensor signal 60 to a processor 62, which processes the signal as described more fully hereinbelow. The first signal conditioner 54.1 may incorporate buffering, amplification, high-pass, low-pass, or band-pass filtering. The first demodulator 56.1, for example, may provide amplitude demodulation, constant sampling relative to the phase of the first oscillator 36.1, or constant sampling relative to the phase of the signal sensed by the first magnetic sensor 18. For example, any envelope detection or phase or frequency demodulation technique could be used to obtain the demodulated signal. Since various demodulation techniques could be used to extract the crash information from the signal from the first magnetic sensor 18, the particular demodulation method will, for example, depend upon the particular implementation and the cost of the components used to perform this function. In another embodiment, the analog-to-digital conversion function and the demodulation function are combined a single process. It should be understood that the first demodulator 56.1 may also provide for amplification, and that the first analog-to-digital converter 58.1 would incorporate an associated sampler. Changes to the first magnetic field 38.1 at a particular location in the first magnetic circuit 42.1 propagate within the associated first magnetic circuit 42.1 at the speed of light and are seen throughout the first magnetic circuit 42.1. Accordingly, the first magnetic field 38.1 sensed by the at least one first magnetic sensor 18 contains information about the nature of the remainder of the magnetic circuit, including the front door 24 and adjacent A-pillar 44 and B-pillar 32, any of which could be involved in and affected by a side-impact crash.

In the embodiment illustrated in FIG. 1, the vehicle 12 further incorporates a second magnetic crash sensor 10.2 comprising at least one third coil 64 at a corresponding at least one third location 66 of the vehicle 12, and an associated at least one second magnetic sensor 68 at a corresponding at least one fourth location 70 of the vehicle 12. For example, in the embodiment illustrated in FIG. 1, a third coil 64 is located around an upper hinge 72.1 of a rear door 74 of the vehicle 12, and the at least one second magnetic sensor 68 comprises a fourth coil 76 around the striker 28.2 of the door latch assembly 30.2 of the rear door 74, wherein the striker 28.2 is operatively coupled to the C-pillar 78 of the vehicle 12 and the fourth coil 76 is proximate thereto. The at least one third coil 64 is operatively coupled to a second coil driver 34.2, which is in turn operatively coupled to a second oscillator 36.2, wherein an oscillatory signal from the second oscillator 36.2 is applied by the second coil driver 34.2 so as to cause an associated current in the at least one third coil 64, responsive to which the at least one third coil 64 generates a second magnetic field 38.2 comprising magnetic flux 40 in the associated second magnetic circuit 42.2 comprising the B-pillar 32, rear door 74, C-pillar 78, and the body 46, frame 48 or powertrain 50 of the vehicle 12. The second oscillator 36.2 generates an oscillating signal, for example, having either a sinusoidal, square wave, triangular or other waveform shape, at a single frequency or a plurality of frequencies that, for example, are either stepped, continuously swept or simultaneous. The frequency is adapted so that the resulting second magnetic field 38.2 is conducted through the second magnetic circuit 42.2 with sufficient strength so as to provide a useful signal level from the second magnetic sensor 68, which cooperates therewith. The second magnetic field 38.2 is responsive to the reluctance R of the associated second magnetic circuit 42.2, which is affected by a crash involving the elements thereof and/or the gaps 52 therein. The second magnetic field 38.2 is sensed by the at least one second magnetic sensor 68, and a signal therefrom is conditioned by an associated second signal conditioner 54.2, demodulated by a second demodulator 56.2, converted from analog to digital form by a second analog-to-digital converter 58.2 and input as a second magnetic sensor signal 80 to the processor 62, which processes the signal as described more fully hereinbelow. The second signal conditioner 54.2 may incorporate buffering, amplification, high-pass, low-pass, or band-pass filtering. The second demodulator 56.2, for example, may provide amplitude demodulation, constant sampling relative to the phase of the second oscillator 36.2, or constant sampling relative to the phase of the signal sensed by the second magnetic sensor 68. For example, any envelope detection or phase or frequency demodulation technique could be used to obtain the demodulated signal. Since various demodulation techniques could be used to extract the crash information from the signal from the second magnetic sensor 68, the particular demodulation method will, for example, depend upon the particular implementation and the cost of the components used to perform this function. In another embodiment, the analog-to-digital conversion function and the demodulation function are combined a single process. It should be understood that the second demodulator 56.2 may also provide for amplification, and that the second analog-to-digital converter 58.2 would incorporate an associated sampler. Changes to the second magnetic field 38.2 at a particular location in the second magnetic circuit 42.2 propagate within the associated second magnetic circuit 42.2 at the speed of light and are seen throughout the second magnetic circuit 42.2. Accordingly, the second magnetic field 38.2 sensed by the at least one second magnetic sensor 68 contains information about the nature of the remainder of the magnetic circuit, including the rear door 74 and adjacent B-pillar 32 and C-pillar 78, any of which could be involved in and affected by a side-impact crash.

Alternatively, as suggested by FIG. 1, the first coil 14 could be located around the lower hinge 22.2 of the front door 24; the at least one first coil 14 could comprise first coils 14.1, 14.2 around the upper 22.1 and lower 22.2 hinges respectively; the third coil 64 could be located around the lower hinge 72.2 of the rear door 74; or the at least one third coil 64 could comprise third coils 64.1, 64.2 around the upper 72.1 and lower 72.2 hinges respectively. Furthermore, the first 36.1 and second 36.2 oscillators could be one and the same, or could be separate, operating at the same or different frequencies with the same type or different types of waveforms. Other arrangements of the magnetic crash sensor 10 can be used to provide the first 60 or second 80 magnetic sensor signals—for example, as described in U.S. Pat. Nos. 6,407,660, 6,433,688, 6,587,048, 6,777,927, which are incorporated herein by reference.

For example, in another embodiment, the magnetic sensor 18, 68 could comprise a coil located either on the door 24, 74, inside the door 24, 74, or on the frame 48 near a gap 52 between the door 24, 74 and the frame 48. Changes in the position of metal surrounding a single coil can be sensed by monitoring a measure of—or one or more measures responsive to—the self-inductance of the coil, for example, when excited with a time varying voltage, e.g. of constant amplitude. Stated in another way, a single coil can act to both generate and sense and associated magnetic field because current flowing through the coil is responsive to changes in the inductance thereof, whereby the inductance is responsive to both the properties of the coil itself, and to the shape and position of conductive and/or ferromagnetic materials (e.g. metals like steel or aluminum) proximate to the coil that affect the magnetic field associated therewith.

As another example, in yet another embodiment, the first 36.1 and/or second 36.2 oscillators may be replaced with pulse sources, whereby the pulse amplitude may be adapted to provide for sufficient signal-to-noise ratio and the pulse width may be adapted to provide for reduced power consumption.

As yet another example, in yet another embodiment, the first 10.1 and/or second 10.2 magnetic crash sensors need not necessarily incorporate associated first 36.1 or second 36.2 oscillators, or first 56.1 or second 56.2 demodulators, but instead the associated first 60 and second 80 magnetic sensor signals could be responsive to magnetostriction signals, magnetic coil pair signals, ferromagnetic shock signals, or other time varying magnetic signals that do not have a carrier from which the information must be extracted prior to analysis.

Figure 2:
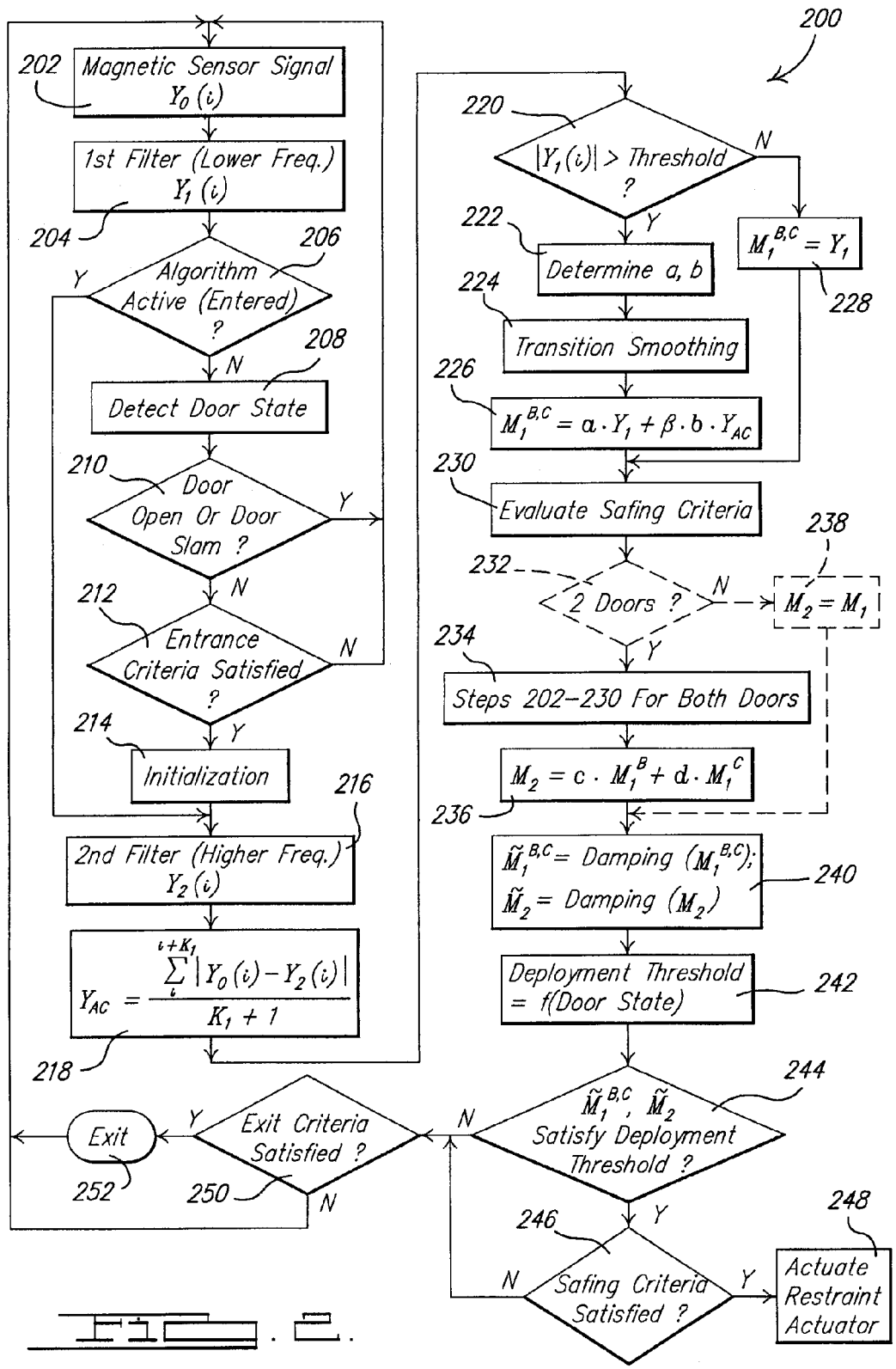
FIG. 2 illustrates a flow chart of a magnetic crash sensing algorithm.

The first magnetic sensor signal 60 from the first magnetic crash sensor 10.1—for a vehicle 12 with one magnetic crash sensor 10 on a particular side of the vehicle 12,—or the first 60 and second 80 magnetic sensor signals from the first 10.1 and second 10.2 magnetic crash sensors—for a vehicle 12 with two magnetic crash sensors 10 on a particular side of the vehicle 12,—are processed, for example, in accordance with a magnetic crash sensing algorithm 200 as illustrated by the flow chart of FIG. 2, which is executed separately for each side of vehicle 12.

Referring to FIG. 2, beginning with step (202), the processor 62 samples the $i^{th}$ sample of the first 60 or second 80 magnetic sensor signal responsive to the associated magnetic flux 40 at the location of the associated first 18 or second 68 magnetic sensor. For example, a sampling rate of about 6 KHz in one embodiment provides for medium-to-high frequency content in the raw sampled signal. For purposes of illustration, this signal is designated as $Y_0(i)$, which corresponds to the sampling of either the first 60 or second 80 magnetic sensor signal, depending upon which is being processed.

Then, in step (204) the sampled signal $Y_0(i)$ is filtered with a first filter to remove noise from the raw magnetic signal, using a relatively lower frequency filter, for example, a running average filter with a sufficiently wide associated time window. The filter is adapted to balance between providing for noise reduction, maintaining a relatively fast step response, and providing for relatively fast computation. For example, in one embodiment, the first filter incorporates a window of about 6 milliseconds, which corresponds to a low-pass cutoff frequency of about 100 Hz. A second embodiment of this filter could be a band-pass filter set produce a signal with relatively lower frequency content, for example from 50 Hz to 250 Hz. The output of the first filter is a first filtered signal $Y_1(i)$.

Then, in step (206), if the core crash detection algorithm (214-250) has been previously entered following step (212) and not subsequently exited at step (252), the process continues with step (216). Otherwise, in step (208), the opening state of the door is detected from the first filtered signal $Y_1(i)$, or another similar relatively longer time constant/lower frequency signal derived from the sampled signal $Y_0(i)$ (e.g. about a 1 Hz low-passed signal). The relatively slow motion of the doors 24, 74 (or of one of the doors 24 in a two-door vehicle 12) can be tracked from the magnitude of the associated first filtered signals $Y_1(i)$. As a door 24, 74 is opened, the magnetic flux 40 interacting with the magnetic sensor 18, 68 associated therewith changes, usually diminishing, in a predictable manner. For a two-door vehicle 12, the amount that the door 24 is open (i.e. degrees of rotation open) may be determined by comparison with calibration data comprising predetermined signal magnitudes known as a function of door angle. For a four-door vehicle 12, the amount that door 24, 74 is open on a given side of the vehicle 12 can be estimated by comparing the first 60 and second 80 magnetic sensor signals from a particular side of the vehicle 12 with the associated calibration data to determine the associated door state of the associated door 24, 74, so to provide for classifying the door state as either fully closed, partially latched, or open. It should be noted that if the first 10.1 or second 10.2 magnetic crash sensor comprises a coil 14, 64 located inside the door 24, 74 of the vehicle 12, wherein the associated first 60 or second 80 magnetic sensor signal was responsive to the self-inductance of the coil 14, 64, and if this coil 14, 64 was not substantially responsive to the position of the associated door 24, 74 relative to the frame 48 of the vehicle 12, then steps (208) and (210) of the magnetic crash sensing algorithm 200 would be omitted when processing that first 60 or second 80 magnetic sensor signal.

Generally, for each combination of these possible door states, the interpretation of the first 60 and second 80 magnetic sensor signals can be adjusted to avoid inadvertent deployments, alter deployment thresholds, or temporarily disable the safety restraint actuator 82, in accordance with the vehicle manufacturer's specifications. Recognition of the door state of the door 24, 74 provides for preventing inadvertent actuation of safety restraint actuator(s) 82 responsive to hard door slams or other "abuse events" when the doors 24, 74 are not fully latched. Levels of magnetic flux 40 that cannot be attributed to one of the possible door states can be indicative of a system failure or a change in the properties or geometry of the door 24, 74 beyond acceptable levels. Responsive to measuring an abnormal level of magnetic flux 40, the processor 62 can use an indicator 84, or an alarm, to alert an occupant of the vehicle 12 of a potential system failure. Such recognition is possible within a relatively short period of time—e.g. within seconds—after occurrence and the monitoring for such a failure can occur continuously while the system is active.

Figure 3:
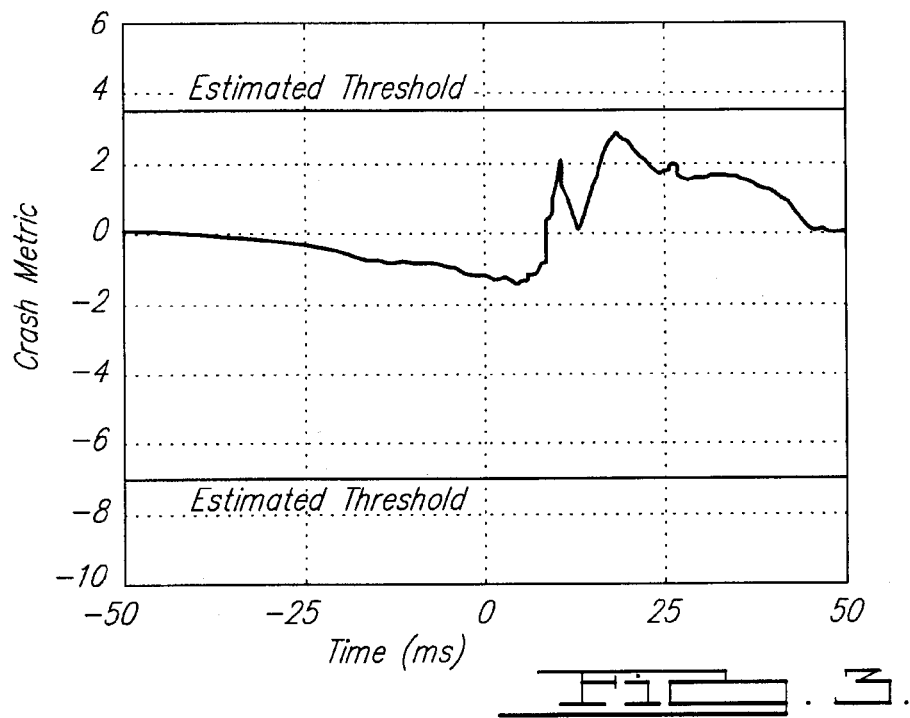
FIG. 3 illustrates a plot of a signal from a magnetic sensor of a magnetic crash sensor associated with a front door of a vehicle responsive to a relatively high speed slam of the front door.

Generally, if a door 24, 74 were open, the associated safety restraint actuator 82 cannot operate properly to protect an associated occupant, and therefore typically should be disabled until the door 24, 74 is closed. Furthermore, a door 24, 74 that is slammed can cause an associated large signal that could otherwise be incorrectly interpreted as a crash (unless an associated coil 14, 64 operated in a self-inductance mode were located inside the door 24, 74). For example, FIG. 3 illustrates a first magnetic sensor signal 60 generated responsive to a front door 24 being slammed shut by a hydraulic robot in accordance with a less than worse case condition, wherein the magnitude of the resulting first magnetic sensor signal 60 approaches an associated crash detection threshold. Accordingly, in one embodiment, if either door 24, 74 is detected as being either open or slammed on particular side of the vehicle 12, then the crash detection algorithm would prevent a safety restraint actuator 82, e.g. side air bag inflator, associated with that side of the vehicle 12 from actuating, so as to prevent an inadvertent deployment thereof. The responsiveness of the first 60 and second 80 magnetic sensor signals to the position of the door 24, 74 can be used to provide an indication to the driver if the door 24, 74 were open or not fully closed and could also control the activation of interior vehicle lighting, replacing the conventional door ajar switch. Such a door ajar detection function could also occur when the vehicle 12 was not turned on if the magnetic field were applied at a low duty cycle to conserve power.

If the door 24, 74 were partially latched, then the magnitude of the corresponding first 60 or second 80 magnetic sensor signal responsive to a crash can be substantially greater than that for a fully closed door 24, 74, however, if detected, this condition can be compensated by adjusting associated discrimination thresholds so as to avoid an inadvertent deployment of the safety restraint actuator 82 responsive to a significant, non-crash event (also known as an "abuse event"), as described more fully hereinbelow. The magnitude of the impact response of a coil 14, 64 operated in a self-inductance mode and located inside the door 24, 74 is not substantially affected by latch state of the door 24, 74 (i.e. fully latched or partially latched).

Figure 4:
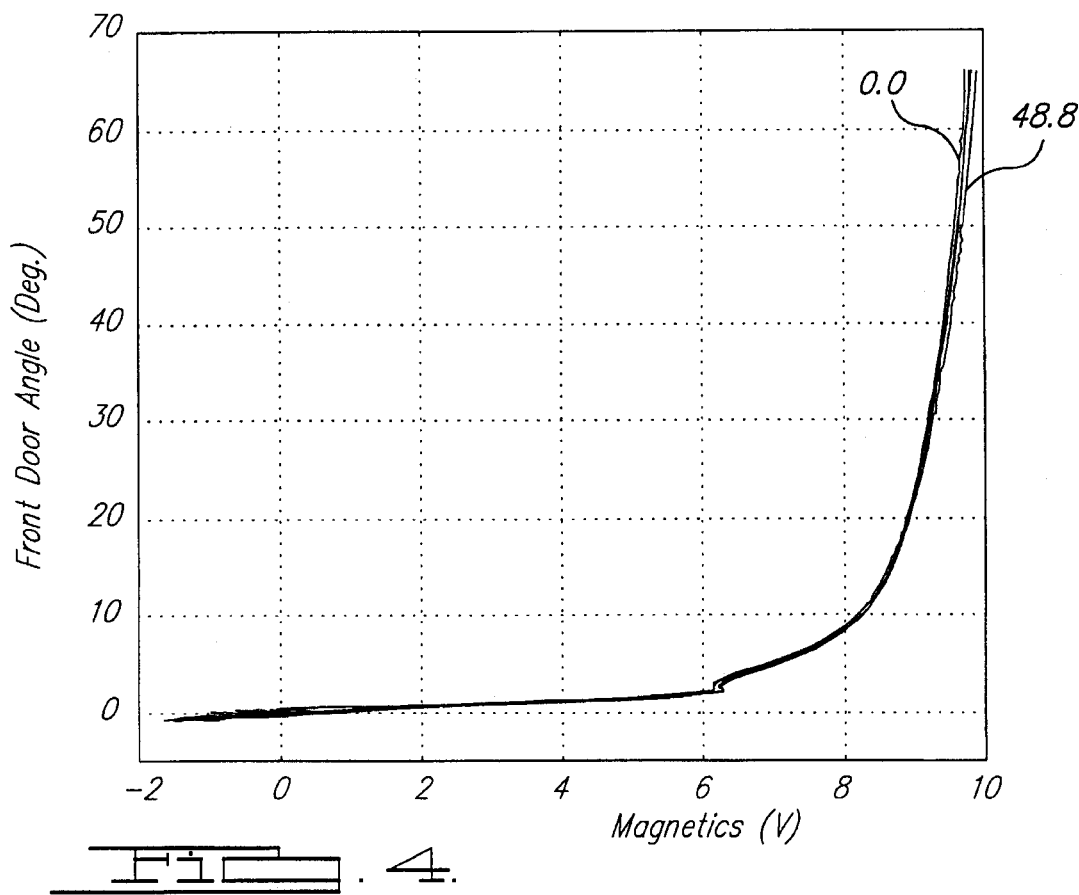
FIG. 4 illustrates a plot of a signal from a magnetic sensor of a magnetic crash sensor associated with a front door of a vehicle responsive to a relatively high speed slam of the front door, for various opening angles of the associated rear door.

Referring to FIG. 4, the first magnetic sensor signal 60 from the first magnetic sensor 18 proximate to the B-pillar 32 is responsive to the angle of the front door 24 and is nearly independent of the angle of the rear door 74. Accordingly, it is possible to estimate the angle of the front door 24 from the magnitude of the first magnetic sensor signal 60, particularly the associated first filtered signal $Y_1(i)$, using calibration data, for example, as illustrated in FIG. 4. The sensitivity of the first magnetic sensor signal 60 is greater for smaller door angles than larger door angles, and for angles less than about 15 degrees, the door angle can be estimated relatively accurately. It is preferable that relatively short term signal offsets caused by effects other than door angle, such as temperature or recent mechanical changes to the front door 24, be maintained to less than an equivalent of about ±1 degree, in order to estimate the associated door state of the front door 24 sufficiently accurately Longer term signal offsets caused by effects such as door droop or accumulated damage can be characterized by monitoring the offset over time, and compensated by subtracting the offset from the signal. Another way to adjust for changes in door alignment over time is to compare the voltage applied to the at least one first coil 14 with the corresponding resulting current passing therethrough. Faraday's Law can be used to derive a relationship between the inductance L of the at least one first coil 14, which is influenced by the proximity to nearby metal (i.e. the local gap between the door 24 and the first location 16 of the at least one first coil 14), and the voltage (V) across and current (I) through the at least one first coil 14 (i.e. V=L*dI/dt). The measure of coil inductance L derived from the known current (I) and voltage (V) in the at least one first coil 14 can provide for adapting the expected response of the first magnetic crash sensor 10.1 as a function of door angle.

Figure 5:
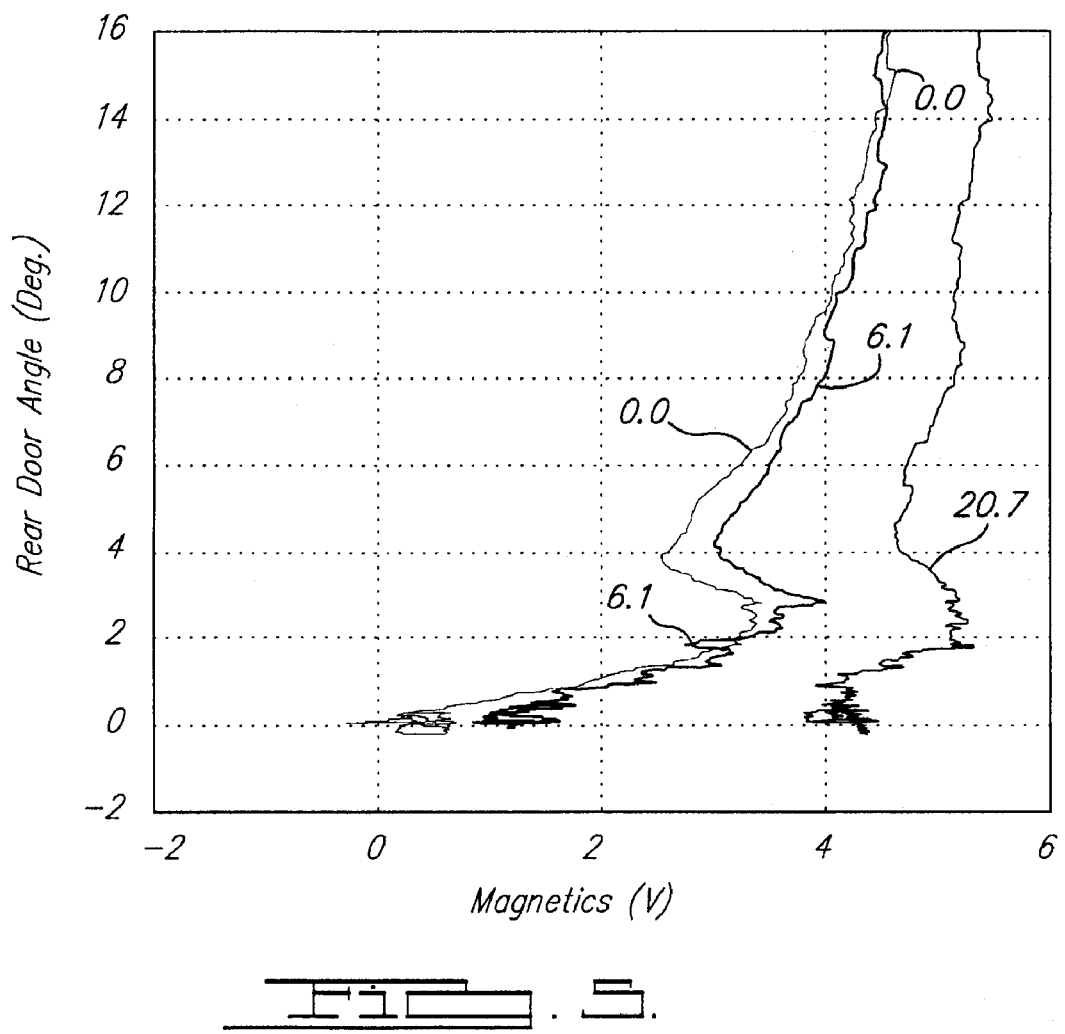
FIG. 5 illustrates a plot of a signal from a magnetic sensor of a magnetic crash sensor associated with a rear door of a vehicle responsive to a relatively high speed slam of the rear door, for various opening angles of the associated front door.

Referring to FIG. 5, the second magnetic sensor signal 80 from the second magnetic sensor 68 proximate to the C-pillar 78 is a strong function of the angle of the rear door 74 and is also a function of the angle of the front door 24. Accordingly, because the second magnetic sensor signal 80 has significant response to the angle of the front door 24, the angle and associated door state of the front door 24 is determined first, and then used in the determination of the angle of the rear door 74. If the door state of the front door 24 is open, e.g. having an angle greater than about three degrees, then the door state of the rear door 74 need not be determined because, in that case, the safety restraint actuator 82 on that side of the vehicle 12 would be disabled anyway. If the door state of the front door 24 is either fully closed or partially latched, then the angle of the rear door 74 can be determined from the offset of the second magnetic sensor signal 80 using calibration data, for example as illustrated in FIG. 5. As with the front door 24, it is preferable that relatively short term signal offsets in the second magnetic sensor signal 80 caused by effects other than door angle, such as temperature or recent mechanical changes to the rear door 74, be maintained to less than an equivalent of about ±1 degree, in order to estimate the associated door state of the rear door 74 sufficiently accurately. Longer term signal offsets caused by effects such as door droop or accumulated damage can be characterized by monitoring the offset over time, and compensating by subtracting the offset from the signal.

Returning to FIG. 2, following the estimation in step (208) of the door state of the front 24 and rear 74 doors, in step (210), if a front 24 or rear 74 door is detected as being either open or slammed, the core crash detection algorithm (214-250) is not entered, but instead, the process repeats with step (202). For example, in one embodiment, a potential adverse affect of a door slam condition can be avoided by delaying the confirmation of a partially latched or closed door state for a brief period of time following the initial detection thereof.

Otherwise, if the front 24 and rear 74 doors are either partially latched or fully closed, then in step (212), if criteria for commencing the core crash detection algorithm (214-250), i.e. entrance criteria, are satisfied, then the core crash detection algorithm (214-250) is entered commencing with step (214). For example, the first filtered signal $Y_1(i)$ is compared with one or more previous values thereof for each door 24, 74, and if there is a sudden change in the first filtered signal $Y_1(i)$ for either door 24, 74 exceeding a minimum rate threshold, and if the magnitude of the first filtered signal $Y_1(i)$ exceeds a threshold, then the entrance criteria is satisfied. The algorithm entrance requirement of a significant and rapid shift in the magnitude of the magnetic flux 40 reaching the magnetic sensor 18, 68 provides a relatively simple way to reject various forms of AC electrical or mechanical noise. As another example, in one embodiment, if the absolute magnitude of the first filtered signal $Y_1(i)$ for the rear door 74 exceeds a threshold of about 0.6 volts, then the entrance criteria is satisfied. Although the magnetic crash sensing algorithm 200 of FIG. 2 illustrates a single step (212) at which the entrance criteria is tested, it is anticipated that there may be a plurality of different entrance criteria for associated different portions of the overall magnetic crash sensing algorithm 200, whereby there would be more than one associated step at which it would be determined if the associated entrance criteria satisfied the corresponding criteria necessary to commence that particular portion of the magnetic crash sensing algorithm 200. Upon entrance, the core crash detection algorithm (214-250) and associated steps (202) and (204) continue to be executed in sequence until either the safety restraint actuator 82 is actuated in step (248), or until the core crash detection algorithm (214-250) exits with step (252) because of either damped-out values of the associated discrimination metrics or because of a time-out condition.

Upon entrance of the core crash detection algorithm (214-250), in step (214), associated variables of the magnetic crash sensing algorithm 200 are initialized. Then in step (216), the sampled signal $Y_0(i)$ is filtered, for example, with a second low-pass filter with a relatively higher cut-off frequency, so as to extract relatively higher frequency information from the raw magnetic signal, for example, by using a running average filter with a relatively narrower associated time window. For example, in one embodiment, the first filter incorporates a window of about 1.1 milliseconds which provides information in the range from DC to 250 Hz. The output of the second filter is a second filtered signal $Y_2(i)$.

Then, in step (218), an AC measure $Y_{AC}$ is calculated so as to provide a measure of mid-to-high frequency information from the magnetic signal on the impact side of the vehicle 12, for example, by calculating a running average of the difference between the sampled signal $Y_0(i)$ and the second filtered signal $Y_2(i)$, as follows:

$$Y_{AC} = \frac{\sum_{i}^{i+K_1} |Y_0(i) - Y_2(i)|}{K_1 + 1} \quad (1)$$

For example, in one embodiment, $K_1$ is set so that the width of the running average window is about 5 milliseconds. Measurements have shown that an integration of the AC content of the magnetic signal is, in general, related to, e.g. proportional to, the impact energy or crash severity. The AC measure $Y_{AC}$ is a running average of the difference between the raw data and the mid-frequency low-pass filtered data that provides a measure of the fluctuation (AC) content of the magnetic signal, which is related to the door gap velocity, vibration, and crushing energy being transferred to the door 24, 74 by the crash. In another embodiment, a third filtered signal $Y_3(i)$ is generated by band-pass or high-pass filtering the sampled signal $Y_0(i)$, and the AC measure $Y_{AC}$ is calculated from a running average, or low-pass filtering, of the third filtered signal $Y_3(i)$. In yet another embodiment, the AC measure $Y_{AC}$ is generated from a running average, or low-pass filtering, of a measure $Y_4(i)$ of the time derivative of the third filtered signal $Y_3(i)$, for example, $Y_4(i)=Y_3(i)-Y_3(i-1)$. Accordingly, the AC measure $Y_{AC}$, provides a measure over some recent period of time (about 5 milliseconds) of the mid-to-high frequency content of the original sampled signal $Y_0(i)$, wherein the frequency spectra of the second filtered signal $Y_2(i)$ and the AC measure $Y_{AC}$ exhibits stronger higher frequency content than that of the corresponding first filtered signal $Y_1(i)$.

Stated in another way, for at least one first frequency less than at least one second frequency, the magnitude of a component of the relatively lower frequency first filtered signal $Y_1(i)$ at the at least one first frequency is greater than the corresponding magnitude of a component of the relatively higher frequency second filtered signal $Y_2(i)$ or the AC measure $Y_{AC}$ at the same at least one first frequency; and the magnitude of a component of the relatively lower frequency first filtered signal $Y_1(i)$ at the at least one second frequency is less than the corresponding magnitude of a component of the relatively higher frequency second filtered signal $Y_2(i)$ or the AC measure $Y_{AC}$ at the same at least one second frequency. Depending upon the particular application, the frequency ranges of the filters associated with the relatively lower frequency first filtered signal $Y_1(i)$, and the relatively higher frequency second filtered signal $Y_2(i)$ or the AC measure $Y_{AC}$, may be separated from one another, or may partially overlap, depending upon the nature of the particular vehicle, as necessary to provide for adequate discrimination of various crash and non-crash events from one another, and as necessary to provide for adequate detection speed. For example, data can be collected for a variety of impacts, e.g. pole, soft-bumper, ECE cart, FMVSS 214 barrier, and non-crash events, of various severities, and the associated filter types and cut-off frequencies may be adjusted, along with other parameters of the magnetic crash sensing algorithm 200, so as to provide for generating a timely safety restraint actuation signal when necessary, and so as to not generate a safety restraint actuation signal when not necessary.

Then, from step (220), if the magnitude of the first filtered signal $Y_1(i)$ exceeds a threshold, in steps (222)-(226) the relatively higher frequency AC measure $Y_{AC}$ is combined, e.g. linearly, with the relatively lower frequency first filtered signal $Y_1(i)$ to form first crash metric $M_1^B$ or $M_1^C$, corresponding to the front 24 or rear 74 door respectively. Otherwise, in step (228), the first crash metric $M_1^B$ or $M_1^C$ is set to the value of the corresponding first filtered signal $Y_1(i)$. The requirement of step (220) lessens the possibility of high frequency noise (which is not expected to have significant DC content) falsely enhancing the first crash metric $M_1^B$ or $M_1^C$ during non-crash conditions.

More particularly, in step (222), the values of coefficients a and b are determined. These coefficients are used in step (226) to calculate the first crash metric $M_1^B$ or $M_1^C$ as follows:

$$M_1^{B,C}=a \cdot Y_1 + \beta \cdot b \cdot Y_{AC} \qquad (2)$$

where $\beta$ is a transition-smoothing factor determined in step (224) in accordance with a transition-smoothing algorithm. The coefficients a and b associated with the linear combination are specific to the particular type of vehicle 12, and would be determined from associated crash and non-crash data associated with "abuse events". The coefficients a and b determine the relative weighting or contribution of the relatively lower frequency first filtered signal $Y_1(i)$ and the relatively higher frequency AC measure $Y_{AC}$ in the first crash metric $M_1^B$ or $M_1^C$. For example, for a particular vehicle application, if the higher frequency components of the sampled signal $Y_0(i)$ provide a more reliable and repeatable indication of crash severity, the value of b might be set greater than that of a so as to relatively emphasize the higher frequency information in the first crash metric $M_1^B$ or $M_1^C$. In one embodiment, the coefficients a and b may be constants. In other embodiments, the sign and or magnitude of coefficients a and b may be a dynamic function of time of the sign or value of the second filtered signal $Y_2(i)$.

For example, in one embodiment of steps (220)-(228), if the magnitude of the first filtered signal $Y_1(i)$ associated with the rear door 74 is less than or equal to a threshold, then in step (228), the first crash metric $M_1^B$ or $M_1^C$ is set equal to the corresponding first filtered signal $Y_1(i)$. Otherwise, in step (222), a=1 and b=1 for the front door 24, and a=1 and b=−1 for the rear door 74, wherein the threshold level is the same as for the entrance criteria of step (212). Stated in another way, If $|Y_1^C| \leq DC\_Threshold$ \hfill (3.0)

Then $M_1^B=Y_1^B$ and $M_1^C=Y_1^C$ \hfill (3.1)

Otherwise \hfill (4.0)

$M_1^B=Y_1^B+Y_{AC}^B$ and $M_1^C=Y_1^C-Y_{AC}^C$ \hfill (4.1)

In accordance with another embodiment, additional conditions are provided as follows:

If $Y_1^C < Threshold^C$ OR $Y_1^B < Threshold^B$ \hfill (5.0)

Then Equations (3.0-3.1) and (4.0-4.1) \hfill (5.1)

Otherwise If $Y_1^C > Threshold^C$ Then \hfill (6.0)

If $Y_1^C \leq DC\_Threshold$ Then Equation (4.1) \hfill (6.1)

Otherwise If $Y_1^C \leq -DC\_Threshold$

Then $M_1^B=Y_1^B-Y_{AC}^B$ and $M_1^C=Y_1^C+Y_{AC}^C$ \hfill (6.2)

Otherwise Equation (3.1) \hfill (6.3)

wherein, in one embodiment, $Threshold^B$ is about −2.3 volts and $Threshold^C$ is between −1 and +1 volt.

In step (224), the transition-smoothing algorithm provides for smoothing the effect of a transition between an inclusion of the AC measure $Y_{AC}$ in the first crash metric $M_1^B$ or $M_1^C$, in step (226), and the exclusion thereof in the first crash metric $M_1^B$ or $M_1^C$, in step (228). More particularly, the transition smoothing algorithm provides for determining a value for the transition smoothing factor $\beta$ in equation (2) that a) has a value that is bounded between 0.0 and 1.0; b) is initialized to 0.0; c) is incremented by a factor, for example, between 0.04 and 1.0 (i.e. no smoothing), e.g. 0.09 (i.e. 9%), for each iteration for which the result of step (220) is affirmative; and d) is decremented by that factor each iteration for which the result of step (220) is negative.

Then, in step (230), a safing criteria is evaluated so as to provide an independent basis for determining whether or not to enable actuation of the associated safety restraint actuator 82. Although the particular safing strategy would depend upon the requirements of the vehicle manufacturer, in accordance with one embodiment, the safing strategy is adapted so as to prevent a single point failure from causing an inadvertent actuation of the associated safety restraint actuator 82. The evaluation of the safing criteria may be performed by an independent processor so as to preclude the prospect of a failure of the processor 62 causing an inadvertent deployment. In accordance with one embodiment, the safing strategy is adapted so the first 60 and second 80 magnetic sensor signals are used to safe one another.

Furthermore, signals—e.g. associated current and voltage—from the first 34.1 and second 34.2 coil drivers are also monitored to verify the operation of the associated first 14 and third 64 coils, e.g. to verify the fidelity and operativeness of the coils and associated signals and to monitor the associated noise level. For example, referring to FIG. 1, one or more signals—e.g. a measure of current through the at least one first coil 14 and/or the associated voltage thereacross—from the first coil driver 34.1 are operatively coupled to at least one associated third demodulator 86.1, the output(s) of which is/are operatively coupled to an associated at least one third analog-to-digital converter 88.1, the output(s) of which is/are operatively coupled to the processor 62, so as to provide the signals necessary to verify the operation of the at least one first coil 14. Similarly one or more signals—e.g. a measure of current through the at least one third coil 64 and/or the associated voltage thereacross—from the second coil driver 34.2 are operatively coupled to at least one associated fourth demodulator 86.2, the output(s) of which is/are operatively coupled to an associated at least one fourth analog-to-digital converter 88.2, the output(s) of which is/are operatively coupled to the processor 62, so as to provide the signals necessary to verify the operation of the at least one third coil 64.

In accordance with one embodiment, the safing criteria are satisfied for a particular magnetic crash sensor 10.1, 10.2 if the associated coil driver 34.1, 34.2 generates a substantially noise-free signal at the proper amplitude and frequency, and both the first 60 and second 80 magnetic sensor signals exhibit substantial nominal signal levels and variation over time.

In accordance with another embodiment, the current though the first 14 or third 64 coil is processed to calculate two measures, TXRA and TXRA_ABS, respectively as running averages of the magnitude of this current and the absolute value of the magnitude of this current, wherein the running averages are calculated over a period of, for example, 1 to 7 milliseconds, e.g. 5 milliseconds. If ThresholdRA1<TXRA<ThresholdRA2 and TXRA_ABS<ThresholdRA3, then the current signal from the corresponding first 14 or third 64 coil is considered to be valid, and the corresponding first 14 or third 64 coil is considered to be operative. Also, substantially simultaneously, if $|Y_1|>\text{Threshold}\_Y_1^{B,C}$ and $|Y_{AC}|>\text{Threshold}\_Y_{AC}^{B,C}$ for both the first 60 and second 80 magnetic sensor signals, then the safing criteria is considered to be satisfied, and this condition is latched for a period of time, for example, a predetermined period of 30 milliseconds. If the conditions on TXRA or TXRA_ABS later both become unsatisfied, then the safing condition is unlatched substantially immediately thereafter. Otherwise, if any of the other four conditions become unsatisfied, then the safing condition is unlatched after the period of time lapses, unless within that interval, all six safing conditions again become satisfied.

Then, in step (232), if the vehicle 12 has two (or more) doors, e.g. a front 24 and rear 74 door on a particular side thereof, then in step (234), steps (202) through (230) are performed for each door 24, 74 using the associated first 60 and second 80 magnetic sensor signals from the corresponding first 18 and second 68 magnetic sensors, so as to determine the first crash metrics $M_1^B$ or $M_1^C$ for each door 24, 74.

Then, in step (236), if the vehicle 12 has two (or more) doors, a second crash metric $M_2$ is calculated from the combination, e.g. linear combination, of the first crash metrics $M_1^B$ and $M_1^C$ corresponding to different doors 24, 74 on the same side of the vehicle 12. For example, in one embodiment, the second crash metric $M_2$ is given by:

$$M_2 = c \cdot M_1^B + d \cdot M_1^C \tag{7}$$

where c and d are coefficients that are specific to a particular type of vehicle 12. For example, in one embodiment, c=−1 and d=1. If the vehicle has only one door 24, then, from step (232), in step (238), the second crash metric $M_2$ is set equal to the first crash metric $M_1^B$ (for purposes of describing a general magnetic crash sensing algorithm 200 in the context of a vehicle having an arbitrary number of doors on a side—in a two-door vehicle 12 having only one door 24 on a side, there would be no need to have distinct first $M_1^B$ and second $M_2$ crash metrics).

Then, from either step (236) or (238), in step (240), the values of the first $M_1^{B,C}$ and second $M_2$ crash metric are damped, so that the values of the respective resulting first $\tilde{M}_1^{B,C}$ and second $\tilde{M}_2$ damped crash metrics are attenuated over time to insignificant levels after the event subsides provided that a side impact crash of sufficient severity to warrant actuation of the safety restraint actuator 82 does not occur, even for events for which there may have been associated metal bending resulting from the crash. Damping provides for facilitating algorithm exit in step (250) following significant crash events that were not sufficiently severe to warrant actuation of the safety restraint actuator 82.

For example, in one embodiment, a damping factor α would be given by the summation of the absolute value of the first filtered signal $Y_1(i)$ commencing with algorithm entrance, and a corresponding crash metric M would be given by the product of that damping factor α times the first filtered signal $Y_1(i)$, as follows:

$$\alpha = \frac{C_2}{C_2 + C_1 \cdot \sum_i |Y_1(i)|} \tag{8}$$

$$\tilde{M}(i) = \alpha \cdot Y_1(i) \tag{9}$$

where $C_1$ and $C_2$ are constants.

As another example, in another embodiment, the damping factor α could include an integral of the AC measure $Y_{AC}$ commencing with algorithm entrance, or the sample number since algorithm entrance multiplied by a constant minus the running average of the AC measure $Y_{AC}$ calculated using a relatively long time window, e.g. greater than 10 milliseconds.

As yet another example, following algorithm entrance, the damping process commences if the absolute value of the first filtered signal $Y_1^C(i)$ from the second magnetic sensor signal 80 associated with the rear door 74 exceeds a threshold, e.g. 0.75, at which time a summation value σ(0) is initialized to an initial value $σ_0$, for example, $σ_0$=300. Then, for each subsequent iteration, the second damped crash metric $M_2$ is calculated as follows:

$$\sigma(i) = \gamma \cdot |Y_1^B(i)| + \sigma(i-1) \tag{10}$$

$$\tilde{M}_2(i) = M_2(i) \cdot \frac{\sigma_0}{\sigma(i)} \tag{11}$$

where γ is a damping modification factor, e.g. having a value of 0.7 for the particular embodiment, and $Y_1^B(i)$ is the value of the first filtered signal $Y_1(i)$ based on the first magnetic sensor signal 60.

Then, in step (242), the magnetic crash sensing algorithm 200 provides for adapting a deployment threshold as a function of the door state that was detected in step (208). For example, if one of the doors 24, 74 were partially latched rather than being fully closed, the magnitude of the second damped crash metric $M_2$ would likely be greater than if both doors were fully closed, and less than if both doors were partially latched. Accordingly, the deployment threshold can be adjusted to accommodate the combination of door states on a particular side of the vehicle 12, wherein, in one embodiment, the threshold would be lowest for both doors 24, 74 fully closed, highest for both doors 24, 74 partially latched, and intermediate thereto if one of the doors is fully closed and the other is partially latched. For a first 60 or second 80 magnetic sensor signal associated with a coil 14, 64 operated in a self-inductance mode and located inside the door 24, 74, a preset threshold scheme would be used in lieu of step (242).

Then, in step (244), the first $M_1^{B,C}$ and second $M_2$ damped crash metrics and the AC measure $Y_{AC}$ are compared with associated threshold levels (positive and negative), and, in one embodiment, if each metric or measure exceeds it respective threshold for at least a specified minimum number of consecutive iterations, then, in step (246), if the safing criteria from step (230) are also simultaneously satisfied, then in step (248) the appropriate safety restraint actuator(s) 82 is/are deployed. In one embodiment, neither the satisfaction of the deployment threshold in step (244) nor the satisfaction of the safing criteria in step (246) latches TRUE, but instead, both criteria must be simultaneously TRUE in order for the safety restraint actuator(s) 82 to be actuated. In another embodiment, other logical combinations of the various crash metrics and other measures are used in the actuation decision. For example, in another embodiment, the actuation decision could be governed by one or more of the various crash metrics and measures, or the satisfaction of the safing criteria could latch TRUE, so that an actuation of the safety restraint actuator(s) 82 would occur when the deployment threshold is satisfied in step (244) provided that the safing criteria had been satisfied earlier, subsequent to algorithm entrance.

Otherwise, from either step (244) or step (246), in step (250), if an exit criteria is satisfied, then the core crash detection algorithm (214-250) is exited in step (252), and the magnetic crash sensing algorithm 200 continues with step (202), whereupon subsequent entry of step (206), the algorithm will be indicated as being inactive (i.e. not entered) until the entrance criteria is again satisfied responsive to conditions on the first filtered signal $Y_1(i)$, which continues to be calculated in step (204) following the acquisition of the first 18 or second 68 magnetic sensor in step (202). For example, in accordance with one embodiment, the exit criteria is satisfied if the first filtered signals $Y_1^B$ and $Y_1^C$, the associated AC measures $Y_{AC}^B$ and $Y_{AC}^C$, and the damped crash metric $M_3$ are less than associated threshold values for a specified number of iterations of the core crash detection algorithm (214-250), or if the time period since algorithm entrance in step (212) exceeds a time-out threshold.

The above-described magnetic crash sensing algorithm 200 can be embodied in various ways, and can be modified within the scope of the instant invention.

For example, the first filtered signal $Y_1(i)$ and the AC measure $Y_{AC}$ could be processed separately, as if each were a separate crash metric. These individual metrics could then be separately damped (step (240)) and used separately to compare against individual deployment thresholds (step (244)). These metrics could alternatively be combined with similar metrics derived from a second magnetic sensor 68 to create two $M_2$ metrics (following the example in step (236)): a low frequency and a higher frequency $M_2$ metric. This alternative individual signal processing creates more individual metrics, making the algorithm slightly more complicated, but also providing additional flexibility in setting deployment conditions.

As another example, additional filtered signals might be obtained from the raw data using different window running averages to produce time domain equivalents of high-pass frequency filtering, or other types of filters can be utilized, for example single or multiple pole low-pass or band-pass filters, other digital filters, e.g. FIR or IIR, or Fourier transform filters Several such filtered signals might be combined with each other or with the raw data signal to give measures associated with desired frequency bands. Such additional frequency analysis and derived measures might be necessary for a specific vehicle platform or magnetic system mounting location and method and would be based upon the associated crash data and data from non-crash "abuse events".

The magnetic crash sensing algorithm 200 provides a method of processing magnetic crash signals from a magnetic crash sensor so as to provide for the rapid, real time determination of both the crash severity and the associated crash type (e.g. pole crash vs. barrier crash) for a particular crash event The magnetic crash sensing algorithm 200 provides for the actuation of safety restraint actuator(s) 82 at a relatively early time as necessary so as to provide for protecting the occupant from the crash, while also discriminating lower severity crash events (as determined by potential occupant injury) so as to avoid inadvertent or unnecessary actuation of safety restraint actuator(s) 82, particularly those safety restraint actuator(s) 82 which are not resetable, i.e. reusable for multiple crash events. The magnetic crash sensing algorithm 200 also provides for immunity to external electrical and mechanical "abuse events" including those caused by electromagnetic induction, or localized impacts with relatively low mass but high speed objects. The associated magnetic crash sensors 10.1, 10.2 provide for distributed crash sensing that can be beneficially less sensitive to localized mechanical or electrical disturbances which might otherwise adversely affect a crash sensing system using more localized crash sensors.

The polarity of the associated magnetic crash sensor signals 60, 80 provides information that can be used for distinguishing various types of crashes. For example, in one embodiment, measured data suggests that localized impacts that cause significant intrusion into the vehicle will give a positive crash metric polarity while more broad surface impacts will give a negative polarity crash metric. Pole-like impacts might be identified as positive polarity while cart-like impacts would be identified by negative polarity. The door motion and crush will vary between crash types, potentially producing signals of opposite sign that correspond to more or less magnetic signal (magnetic flux 40) reaching the receiver sensors than is normally received.

Although the magnetic crash sensing algorithm 200 has been described herein in the context of side impact crash detection, a similar algorithm could be used to detect impacts anywhere on the vehicle using appropriate associated magnetic crash sensor hardware.

Figure 6:
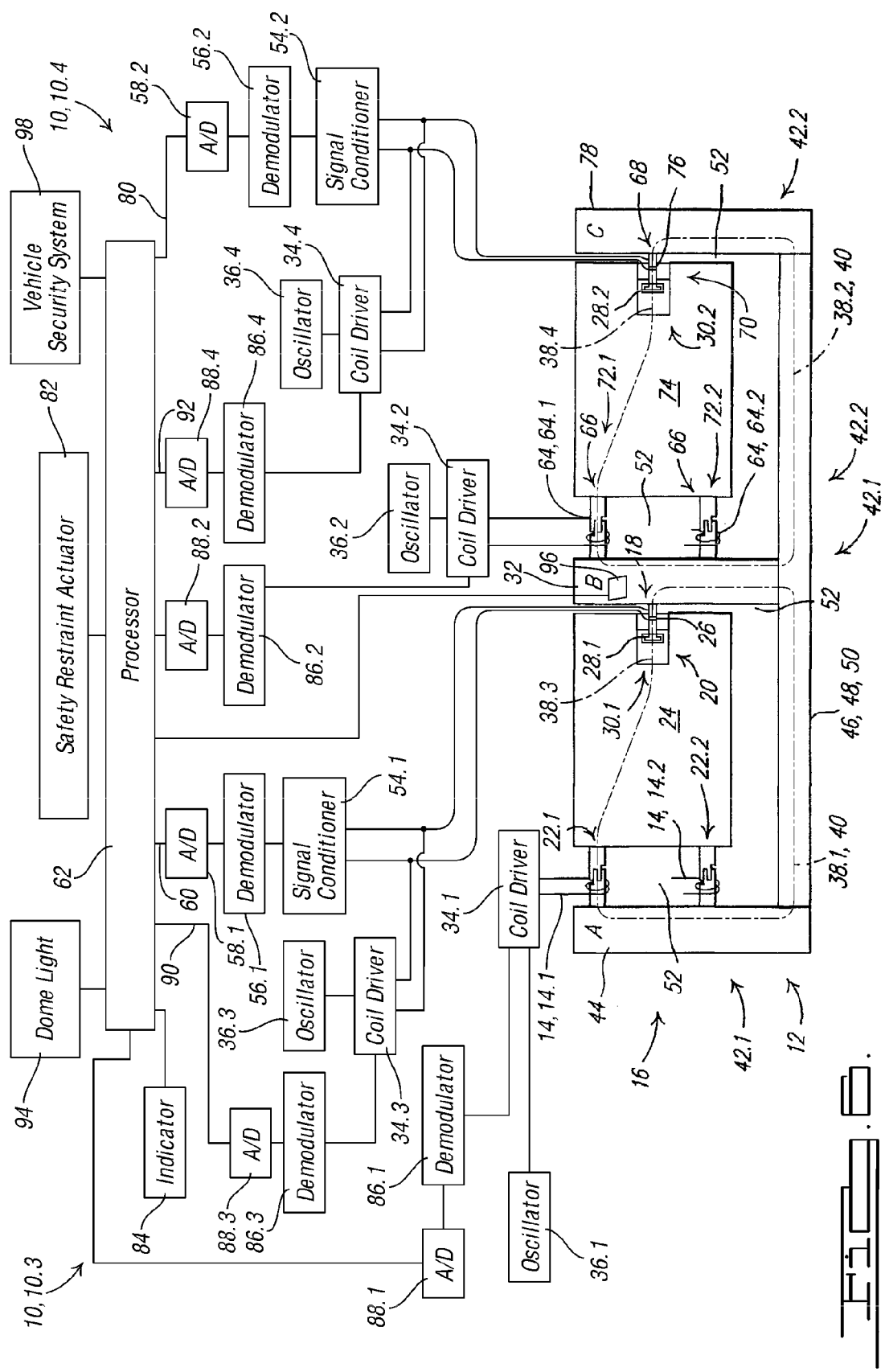
FIG. 6 illustrates a schematic block diagram of a magnetic crash sensor in a vehicle.

Referring to FIG. 6, third 10.3 and fourth 10.4 magnetic crash sensors are adapted similar to the first 10.1 and second 10.2 magnetic crash sensors illustrated in FIG. 1, with the exception that the second 26 and fourth 76 coils at the second 20 and fourth 70 locations respectively are adapted to operate in a receiver mode and a transceiver mode so as to provide for sensing both a crash event involving a respective front 24 or rear 74 door, thereby generating the above-described first 60 and second 80 magnetic sensor signals, and to also provide for either continuously sensing the opening state of the respective front 24 or rear 74 doors, and/or for providing associated safing of the first 60 and second 80 magnetic sensor signals.

The second coil 26 is operatively coupled to a third coil driver 34.3, which is in turn operatively coupled to a third oscillator 36.3, wherein an oscillatory signal from the third oscillator 36.3 is applied by the third coil driver 34.3 so as to cause an associated current in the at least one third coil 64, responsive to which the at least one third coil 64 generates a third magnetic field 38.3 responsive to the reluctance R of the associated magnetic circuit, and which causes eddy currents in associated proximal conductive elements which thereby influences the resulting third magnetic field 38.3. The third oscillator 36.3 generates an oscillating signal, for example, having either a sinusoidal, square wave, triangular or other waveform shape, at a single frequency or a plurality of frequencies that, for example, are either stepped, continuously swept or simultaneous. The third magnetic field 38.3 is responsive to the reluctance R of the associated first magnetic circuit 42.1, which is affected by a crash involving the elements thereof and/or the gaps 52 therein, and which is also affected by the opening state of the front door 24. A signal responsive to the third magnetic field 38.3 and responsive to the self-impedance of the second coil 26 is sensed within the circuitry associated with the third coil driver 34.3 and a resulting signal is demodulated by a fifth demodulator 86.3, converted from analog to digital form by a fifth analog-to-digital converter 88.3 and input as a third magnetic sensor signal 90 to the processor 62 for example, in accordance with the teachings of U.S. application Ser. No. 11/530,492 which is incorporated herein by reference. The frequency of the third oscillator 36.3 is adapted so that the resulting third magnetic field 38.3 is sufficiently strong to provide a useful signal level of the third magnetic sensor signal 90.

The fourth coil 76 is operatively coupled to a fourth coil driver 34.4, which is in turn operatively coupled to a fourth oscillator 36.4, wherein an oscillatory signal from the fourth oscillator 36.4 is applied by the fourth coil driver 34.4 so as to cause an associated current in the at least one third coil 64, responsive to which the at least one third coil 64 generates a fourth magnetic field 38.4 responsive to the reluctance R of the associated magnetic circuit, and which causes eddy currents in associated proximal conductive elements which thereby influences the resulting fourth magnetic field 38.4. The fourth oscillator 36.4 generates a oscillating signal, for example, having either a sinusoidal, square wave, triangular or other waveform shape, at a single frequency or a plurality of frequencies that, for example, are either stepped, continuously swept or simultaneous. The fourth magnetic field 38.4 is responsive to the reluctance R of the associated second magnetic circuit 42.2, which is affected by a crash involving the elements thereof and/or the gaps 52 therein, and which is also affected by the opening state of the rear door 74. A signal responsive to the fourth magnetic field 38.4 and responsive to the self-impedance of the fourth coil 76 is sensed within the circuitry associated with the fourth coil driver 34.4 and a resulting signal is demodulated by a sixth demodulator 86.4, converted from analog to digital form by a sixth analog-to-digital converter 88.4 and input as a fourth magnetic sensor signal 92 to the processor 62 for example, in accordance with the teachings of U.S. application Ser. No. 11/530,492 which is incorporated herein by reference. The frequency of the fourth oscillator 36.4 is adapted so that the resulting fourth magnetic field 38.4 is sufficiently strong to provide a useful signal level of the fourth magnetic sensor signal 92.

Figure 7:
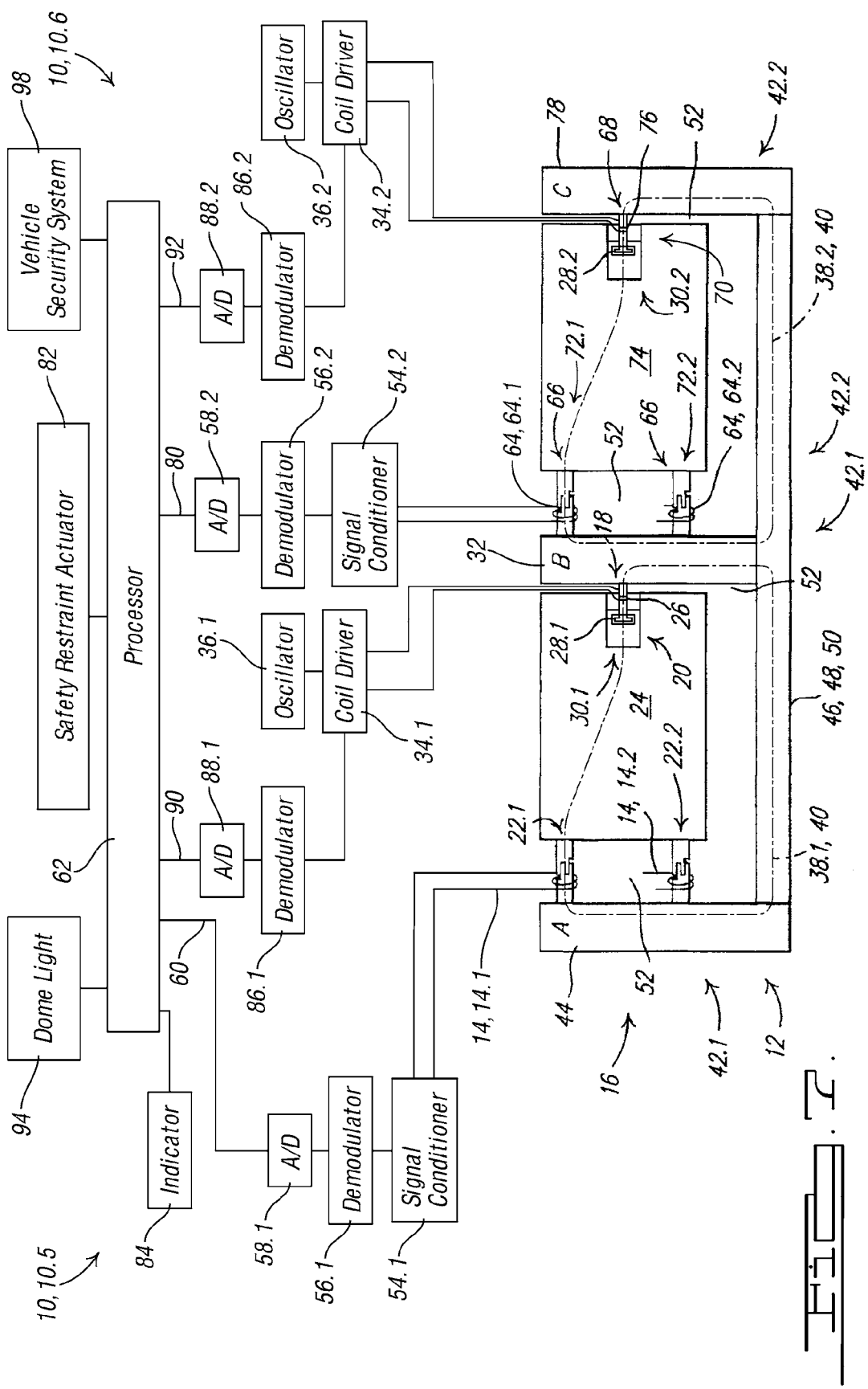
FIG. 7 illustrates a schematic block diagram of a magnetic crash sensor in a vehicle.

Referring to FIG. 7, fifth 10.5 and sixth 10.6 magnetic crash sensors are adapted similar to the first 10.1 and second 10.2 magnetic crash sensors illustrated in FIG. 1, with the exception that the roles of the first 14 and second 26 coils are reversed, and the roles of the third 64 and fourth 76 coils are reversed, wherein the second 26 and fourth 76 coils of the respective fifth 10.5 and sixth 10.6 magnetic crash sensor are each driven in both a transmit mode and a transceiver mode, and the first 14 and third 64 coils are used only in the receive mode.

The above-illustrated combined transmitter/receiver and transceiver topology provides for enhancing the confidence in the sensing of the instant door state, which can be provided for continuously—even with the vehicle 12 in a quiescent (i.e. key off) state—by using a low-power low duty cycle operation in the transceiver mode. The transceiver mode that provides for monitoring the door state can operate on a sufficiently small amount of power so as to operate comfortably in the key-off or sleep energy levels. Accordingly, this provides for key off magnetic-responsive control of a dome light 94, after a factory pre-set permits the associated MSI (Magnetic Side-Impact) processor 62 to know for certain the door status (compared to the associated factory calibration) so the MSI processor 62 can be certain as to arm and when to activate the vehicle dome light 94, as a function of the door position.

One embodiment would involve a (self inductance) transmitting device at the "B" 32 and "C" 78 pillars and would be operated at minimum power. This approach would be activated at the factory and would require minimum power so it would be operated in key-off. The door opening inductance change is significant compared to the change due to a crash and thresholds would be set accordingly. The devices at the "B" and "C" 78 pillars would safe each other during an impact. An accelerometer 96 might also be considered to support safing (e.g. in impact during door ajar situations).

It would be expected that this topology would provide for minimizing vehicle cross talk, reducing the overall cost of electronics. As the system is continuously monitoring the strikers 28.1, 28.2, production scatter and temperature drift would be normalized out of the monitoring device. Production scatter is one time and the value is stored in EEPROM. The temperature slew rate would be measured and the sleep timer (update rate) would be set accordingly.

This approach will recognize door open and closed over time and detect an impact. On a two-door vehicle 12, a safing accelerometer 96 or additional "button" coil (near the striker 28.1, 28.2) could safe.

The continuous detection of the door opening state provides for using the associated magnetic crash sensing system to provide for controlling a dome light 94 in the vehicle 12, or for providing a door opening signal to a vehicle security system 98.

When using the magnetic crash sensing system to control the dome light 94, a sense resistor could be added to validate the bulb to be present and illuminated (perhaps a photo receiver sensor or temperature sensor to validate light or heat present as well).

The system can determine the instant position of the vehicle door 24, 74(open versus ajar for the transmitters at the "B" 32 and "C" 78 pillars) to permit the processor 62 to elect to illuminate the dome light 94 or arm the MSI system for safety and security.

The magnetic crash sensing system can be factory pre-set, i.e. tuned, to guarantee that the door 24, 74is closed at a specific time and calibrate the magnetic crash sensing system (place the hinge and striker signals into NV (non-volatile) memory for future use).

The magnetic crash sensing system can operate on low power and or low duty cycle to obtain standard automotive sleep mode energy consumption levels so the door open/closed movement can be MSI tracked at key off.

To obtain the lowest power performance (for key-off), the magnetic crash sensing system would be operated in a transmitter duty cycle mode. This specification for this mode would perhaps call for the magnetic crash sensing system to send a carrier burst once a second, and during the burst 10 to 20 cycles of the carrier would be transmitted. The 10 to 20 cycles would be enough carrier to permit the demodulator 56.1, 56.2, 86.1, 86.2 to successfully lock on to the hinge signal and test the door open status, while not demanding excessive amounts of power.

At 20,000 Hz the 10 cycles would require 50 microseconds per cycle, or 50*10=500 microseconds. This total time 500 micro-seconds divided by the 1 second repetition rate leads to a duty cycle of 500/1,000,000=0.0005 or 0.05% on time. A 1-watt system at this duty would be (on the average) a 0.05-watt system.

In another embodiment (perhaps preferred for the lowest expected power consumption) the "B" 32 and "C" 78 pillars would utilized at transmitters in normal mode and in "key-off" or sleep mode would act as inductance meters, operating at very low power levels in run mode and even lower power in sleep mode as in sleep mode "B" 32 and "C" 78 pillars would be duty cycle pulsed.

During an impact the inductance (current and voltage) would modulate.

This system will achieve minimal operating power levels running (key-on) or asleep (key off) thus permitting unwanted intrusion monitoring (security) as well as dome light 94 function (safety) and enhanced dome light 94 accuracy.

Figure 8:
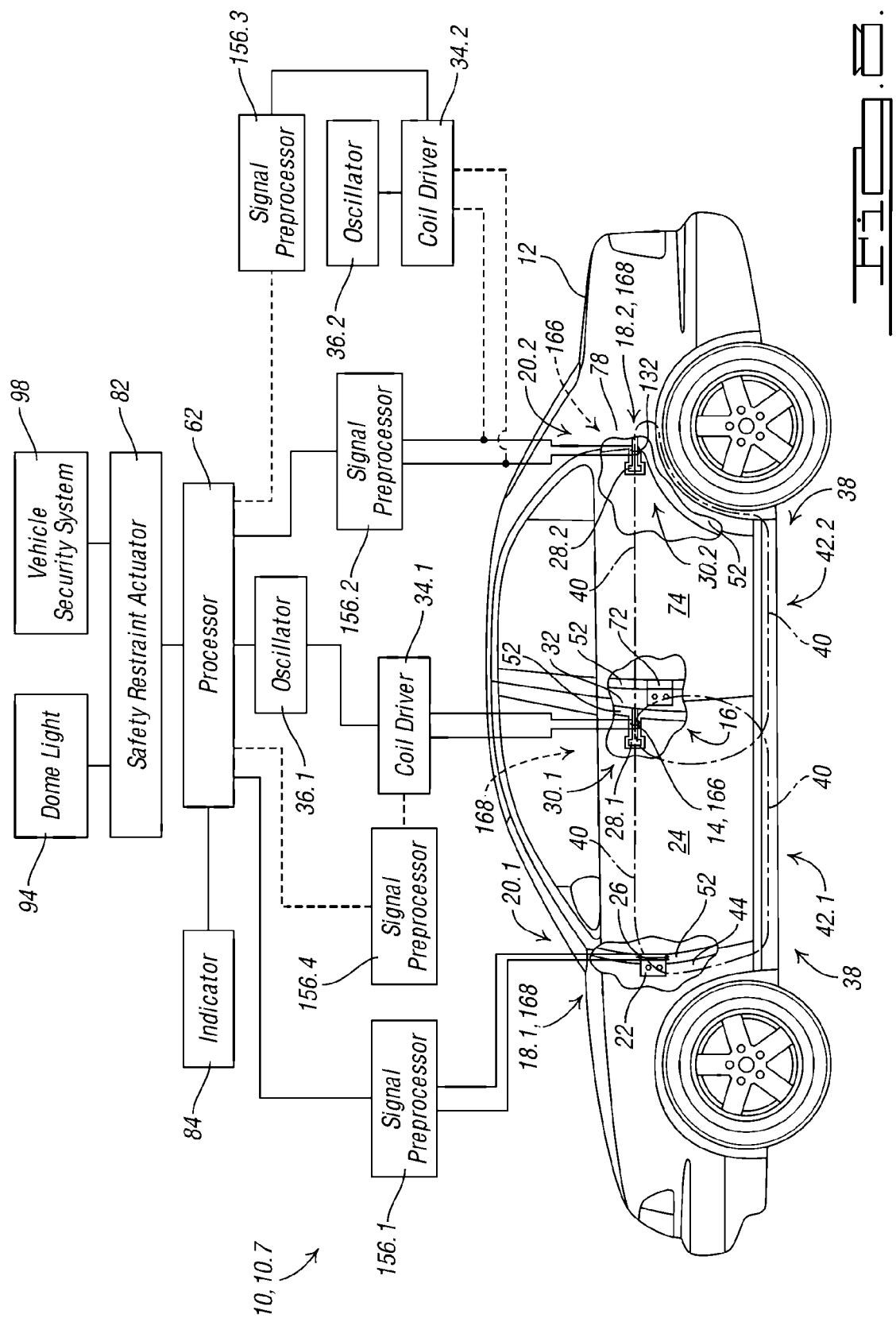
FIG. 8 illustrates a schematic block diagram of a seventh embodiment of a magnetic crash sensing system in a vehicle.

Referring to FIG. 8, a seventh embodiment of a magnetic crash sensing system 10.7 incorporated in a vehicle 12 comprises a first coil 14 at a corresponding first location 16 of the vehicle 12, and a plurality of magnetic sensors 18.1, 18.2 at a corresponding plurality of second locations 20.1, 20.2 of the vehicle 12. For example, in the seventh embodiment illustrated in FIG. 8, the first coil 14 is located around the striker 28.1 of the door latch assembly 30.1 of the front door 24, and the magnetic sensors 18.1, 18.2 comprise a second coil 26 around a hinge 22 of the front door 24, and a third coil 132 around a striker 28.2 of the door latch assembly 30.2 of the rear door 74, wherein the striker 28.1 of the door latch assembly 30.1 of the front door 24 is operatively coupled to the B-pillar 32 of the vehicle 12, and the striker 28.2 of the door latch assembly 30.2 of the rear door 74 is operatively coupled to the C-pillar 78 of the vehicle 12. The first coil 14 is operatively coupled to a coil driver 34.1, which is in turn operatively coupled to an oscillator 36.1, wherein an oscillatory signal from the oscillator 36.1 is applied by the coil driver 34.1 so as to cause an associated current in the first coil 14, responsive to which the first coil 14 generates a magnetic field 38 comprising magnetic flux 40 in associated first 42.1 and second 42.2 magnetic circuits. The second 26 and third 132 coils surround metallic elements of the associated first 42.1 and second 42.2 magnetic circuits, and the magnetic flux 40 propagates within the associated magnetically permeable material of the first 42.1 and second 42.2 magnetic circuits and flows through the second 26 and third 132 coils surrounding the associated magnetically permeable material. The second 26 and third 132 coils generate voltage signals responsive to the oscillating magnetic flux 40, or component thereof, directed along the axis of the second 26 and third 132 coils respectively, in accordance with Faraday's law of magnetic induction. The doors 24, 74 are isolated from the remainder of the vehicle 12, e.g. the frame, by the gaps 52 therebetween, except where the hinges 22,72 and door latch assemblies 30.1, 30.2 provide relatively lower reluctance paths therebetween.

The oscillator 36.1 generates an oscillating signal, for example, having either a sinusoidal, square wave, triangular or other waveform shape, of a single frequency, or a plurality of frequencies that are either stepped, continuously swept or simultaneous. The frequency is adapted so that the resulting magnetic field 38 is conducted through the first 42.1 and second 42.2 magnetic circuits with sufficient strength so as to provide a useful signal level from the associated magnetic sensors 18.1, 18.2 that cooperate therewith. For example, the oscillation frequency would typically be less than about 50 KHz for a steel structure, e.g. 10 to 20 KHz in one embodiment. The magnetic field 38 is responsive to the reluctance R of the associated first 42.1 and second 42.2 magnetic circuits, which is affected by a crash involving the elements thereof and/or the gaps 52 therein.

The magnetic field 38 is sensed by the magnetic sensors 18.1, 18.2, and a signal therefrom is conditioned by associated signal preprocessors 156.1, 156.2 which are operatively coupled to a processor 62. For example, each signal preprocessor 156.1, 156.2 demodulates the signal from the associated magnetic sensor 18.1, 18.2 with an associated demodulator, and converts from analog to digital form with an associated analog-to-digital converter which is sampled and input to the processor 62. The signal preprocessors 156.1, 156.2 may also provide for amplification. Changes to the magnetic field 38 at a particular location in the first 42.1 and second 52.2 magnetic circuits propagate therewithin at the speed of light and are seen therethroughout. Accordingly, the magnetic field 38 sensed by the magnetic sensors 18.1, 18.2 contains information about the nature of the remainder of the magnetic circuit, including the front 24 and rear 74 doors and the adjacent A-pillar 44, B-pillar 32 and C-pillar 78, any of which could be involved in, or affected by, a side-impact crash.

The seventh embodiment of the magnetic crash sensing system 10.7 can operate in a variety of modes, for example, as disclosed in U.S. Pat. Nos. 6,777,927, 6,586,926, or 6,407,660; or U.S. application Ser. Nos. 10/666,165 or 10/946,151; each of which is incorporated in its entirety by reference herein. Accordingly, the magnetic crash sensing system 10.7 provides for controlling a safety restraint actuator 82, e.g. side air bag system, responsive to the detection of a crash, and/or provides for activating an indicator 84, e.g. warning lamp, warning message, or audible alarm, e.g. responsive to a door open or partially latched condition, or a prediction of an impending crash responsive to the interaction of an approaching vehicle with a proximity field of the magnetic crash sensing system 10.7.

The arrangement of the first coil 14 as a transmitter coil 166 at a central location, e.g. proximate to the B-pillar 32, and the plurality of magnetic sensors 18.1, 18.2, e.g. receiver coils 168, in cooperation therewith at relatively distal locations relative thereto, e.g. proximate to the A-pillar 44 and C-pillar 78 respectively, provides for a magnetic crash sensing system 10.7 that is responsive to disturbances affecting either the front 24 or rear 74 doors on a side of the vehicle, but requiring only a single transmitter coil 166, e.g. the first coil 14 as presently illustrated in FIG. 8. Alternatively the magnetic crash sensing system 10.7 could be adapted so that either the second 26 or third 132 coils acted as the transmitter coil 166, with the remaining coils acting as associated magnetic sensors 18.1, 18.2/receiver coils 168.

Figure 9:
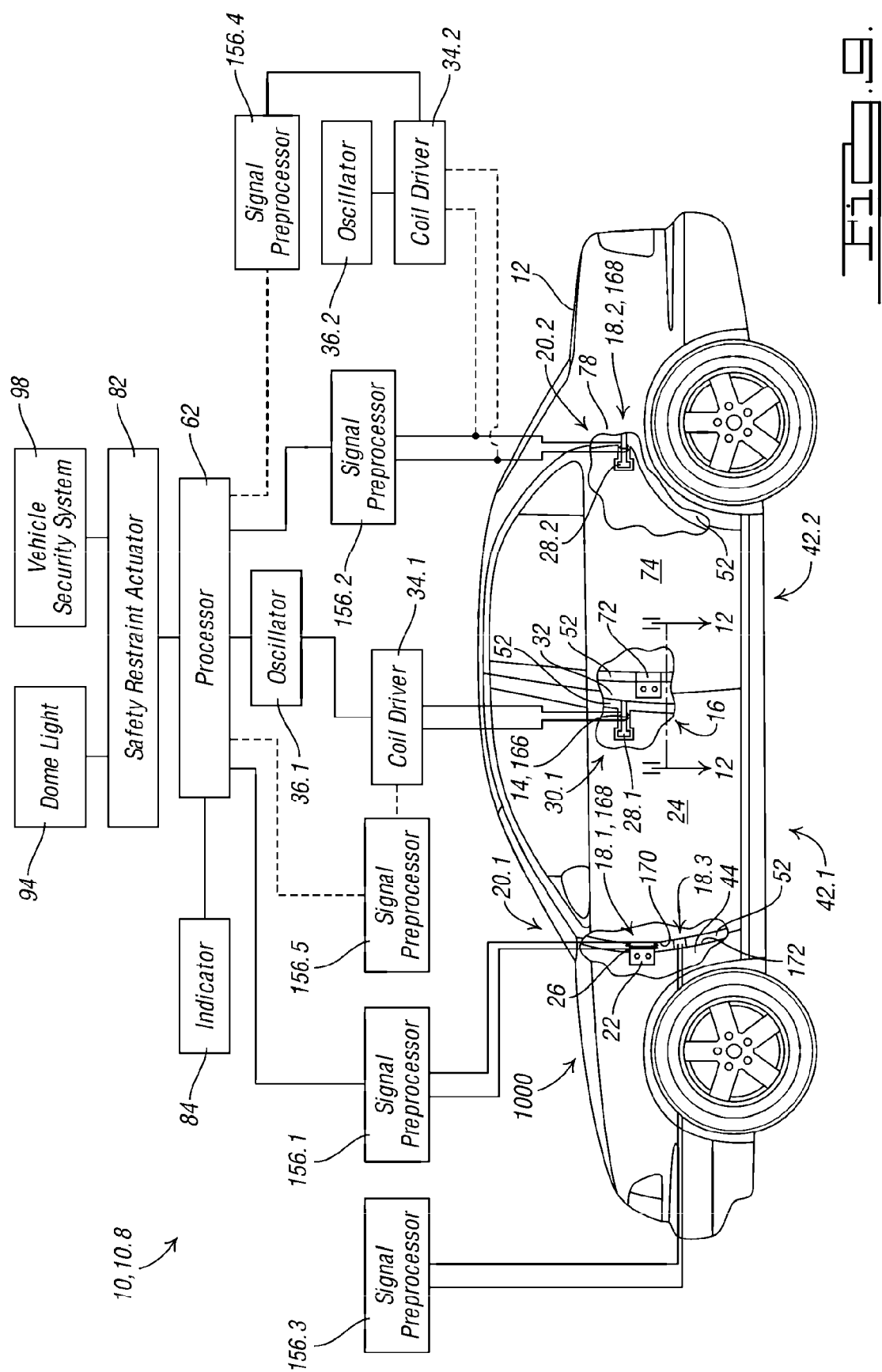
FIG. 9 illustrates a schematic block diagram of an eighth embodiment of a magnetic crash sensing system in a vehicle.

Referring to FIG. 9, a eighth embodiment of a magnetic crash sensing system 10.8 incorporates all of the features of the seventh embodiment 10.7 described hereinabove, and further comprises at least one additional magnetic sensor 18.3 within a gap 52 between the fixed body structure and a door, e.g. the front door 24. Although FIG. 9 illustrates the additional magnetic sensor 18.3 located between the front edge 170 of the front door 24 and an adjacent edge 172 of the A-pillar 44, the additional magnetic sensor 18.3 could be located elsewhere in the gap 52 between either the front 24 or rear 74 door and the fixed body structure of the vehicle 12. The additional magnetic sensor 18.3 is operatively coupled to an associated signal preprocessor 156.3 which is in turn operatively coupled to the processor 62, so as to provide a signal that can be used either for safing or as a primary crash sensing signal.

Generally, the mechanical components of the first 42.1 and second 42.2 magnetic circuits in which the transmitter 166 and receiver 168 coils are placed are constructed for other functions. For example, the hinges 22, 72 and strikers 28.1, 28.2 are designed with primary functions, e.g. to facilitate occupant entrance, exit and vehicle locking, which components are generally constructed according to associated specifications that govern strength, geometry, material and design constraints. Accordingly, configuring the transmitter 166 or receiver 168 coils, that would encircle the magnetically permeable members, can be otherwise challenging and subject to constraints on coil shape, turn count, connector access and wire gauge that might otherwise limit the optimization of the transmitter 166 or receiver 168 coils for their primary function to generate or sense time varying magnetic fields. Also, given a wide range of hinge 22, 72 and striker 28.1, 28.2 designs, it may be difficult to standardize the transmitter 166 or receiver 168 coils for a wide range of vehicle platforms if the transmitter 166 or receiver 168 coils are to encircle metal, which can increase the cost of these and associated components for a given vehicle platform. Furthermore, coils intended to be assembled around existing components may need to be installed prior to the final assembly of that component in the vehicle which necessitates close cooperation with the supplier of that component so as to provide for the integration of the coil therewith. For example, for many hinges 22, 72, inclusion of a coil thereon would require that the coil undergo an E-coat process along with the hinge 22, 72.

Figure 10:
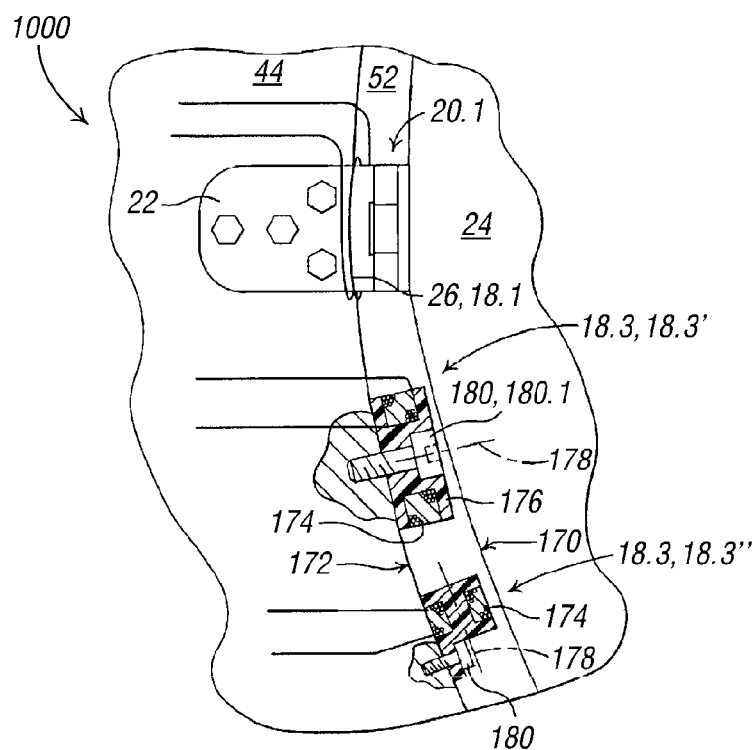
FIG. 10 illustrates a detailed view of several coils from the eighth embodiment illustrated in FIG. 9, and illustrates several coil embodiments.

Referring to FIG. 10, the fragmentary view 1000 of the A-pillar 44 and front door 24 from FIG. 9 is illustrated in greater detail, illustrating several embodiments of the additional magnetic sensor 18.3, 18.3', 18.3" in greater detail, each comprising a gap coil 74 that is sufficiently small to be located within the gap 52 between the A-pillar 44 and the front door 24. The gap coil 174 of the additional magnetic sensor 18.3, 18.3', 18.3" is not necessarily constrained to surround existing magnetic permeable components of the first 42.1 or second 42.2 magnetic circuits, so as to provide for placement of the gap coil 174 in locations without being adversely constrained by the geometries or functions of proximate elements of the vehicle 12. The gap coil 174 is wound around an associated spool 176 which is fastened to the fixed structure of the vehicle, e.g. the edge 172 of the A-pillar 44 facing the front edge 170 of the front door 24. Generally, the gap coil 174 can be used as either a transmitter coil 166 or a receiver coil 168, although in the eighth embodiment of a magnetic crash sensing system 10.8, the gap coil 174 is used as a receiver coil 168 responsive to the magnetic flux 40 within the gap 52, e.g. resulting from changes in the proximity field of magnetic flux 40 and/or to eddy currents that propagate through the surrounding metal structures. The gap coil 174 can be oriented so as to optimize the signal-to-noise ratio of the signal generated thereby responsive to a crash or other disturbance to be monitored.

For example, in a first magnetic sensor 18.3', the axis 178 of the gap coil 174 is substantially perpendicular to the edge 172 of the A-pillar 44 and to the front edge 170 of the front door 24 when the front door 24 is closed. The first magnetic sensor 18.3' is attached to the A-pillar 44 with a fastener 180 through the associated spool 176, e.g. a socket head screw 180.1 through a counterbore in the spool 176. The magnetic permeability of the fastener 180 can be adapted in accordance with the sensing or field generating requirements of the associated gap coil 174. For example, the fastener 180 associated with the first magnetic sensor 18.3' is substantially aligned with the axis 178 of the gap coil 174, so that a fastener 180 of a material with a relatively high permeability, e.g. carbon steel or electrical steel, will tend to concentrate the magnetic flux 40 through the gap coil 174, whereas a fastener 180 of a material with a relatively low permeability, e.g. stainless steel, aluminum or brass, will tend to emulate an air core so that the magnetic sensor 18.3' has less of a tendency to perturb the associated first 42.1 or second 42.2 magnetic circuit. As another example, in a second magnetic sensor 18.3", the axis 178 of the gap coil 174 is substantially parallel to the edge 172 of the A-pillar 44 and to the front edge 170 of the front door 24, so as to be substantially aligned with the length of the associated gap 52. The second magnetic sensor 18.3' is shown attached to the A-pillar 44 with a fastener 180 through a flange that depends from the associated spool 176.

Figure 11:
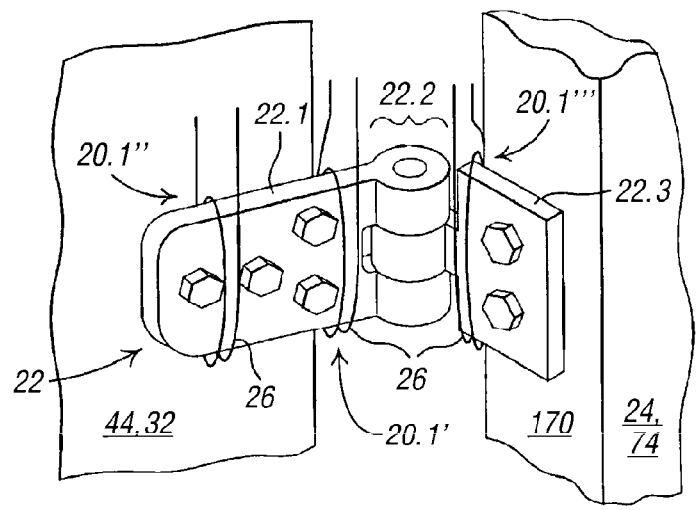
FIG. 11 illustrates various locations for a coil around a door hinge.

FIG. 10 also illustrates the second coil 26 around a hinge 22 of the front door 24. Referring to FIG. 11, the second coil 26 can be located at various second locations 20.1', 20.1", 20.1'" relative to the hinge 22. For example, in one embodiment, the second location 20.1' is on around a portion of the hinge plate 22.1 that attaches to the fixed vehicle structure, e.g. the A-pillar 44 or B-pillar 32, at a location between the A-pillar 44 or B-pillar 32 and the hinge joint 22.2. In another embodiment, the second location 20.1" is on around a portion of the hinge plate 22.1 that attaches to the fixed vehicle structure, e.g. the A-pillar 44 or B-pillar 32, at a location where the hinge plate 22.1 is bolted to the A-pillar 44 or B-pillar 32. In yet another embodiment, the second location 20.1'" is on around a portion of the hinge plate 22.3 that attaches to the front 24 or rear 74 door, at a location between the front edge 170 of the front 24 or rear 74 door and the hinge joint 22.2.

Figure 12:
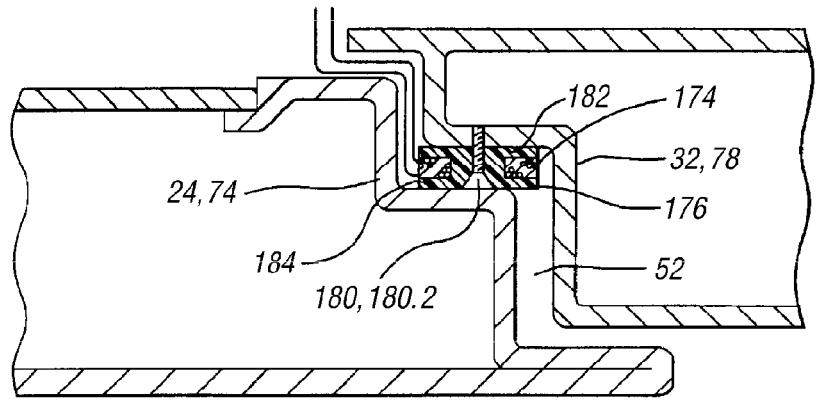
FIG. 12 illustrates a coil mounted so as to provide for sensing a door opening condition.

Referring to FIG. 12, a gap coil 174 may be mounted on the B-pillar 32 or C-pillar 78 on an outward facing surface 182 in the gap 52 between the outward facing surface 182 and a corresponding proximate inward facing surface 184 of the front 24 or rear 74 door respectively. In the embodiment illustrated in FIG. 12, the gap coil 174 is secured to the outward facing surface 182 with a flat head screw 180.2 through the spool 176 around which the coil is wound. The gap coil 174 illustrated in FIG. 12 is responsive to changes in reluctance of the associated first 42.1 or second 42.2 magnetic circuit responsive to the door opening state of the associated front 24 or rear 74 door and accordingly can be used to generate a signal indicative thereof, e.g. so as to provide for discriminating between a closed door, a partially latched door and an open door.

Figure 13:
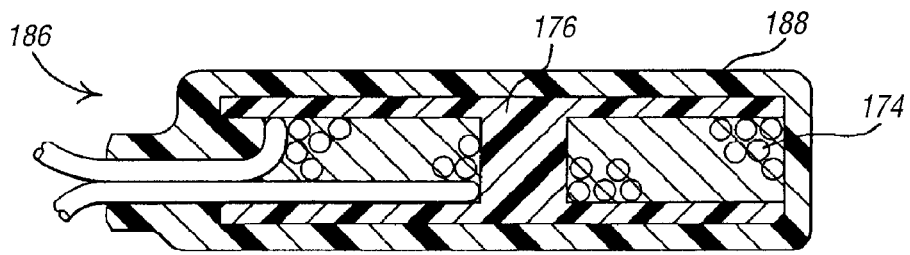
FIG. 13 illustrates an encapsulated coil assembly.

Referring to FIG. 13, a gap coil assembly 186 comprises a gap coil 174 wound around a spool 76, both of which are encapsulated in an encapsulant 188, e.g. a silicone potting compound, so as mitigate against environmentally induced degradation. The gap coil 174 for example, is wound of wire, e.g. 20 to 50 gauge enamel coated conductive wire, e.g. copper or aluminum. The spool 176 is, for example, made of a relatively rigid material such as plastic or aluminum.

Figures 14, 15:
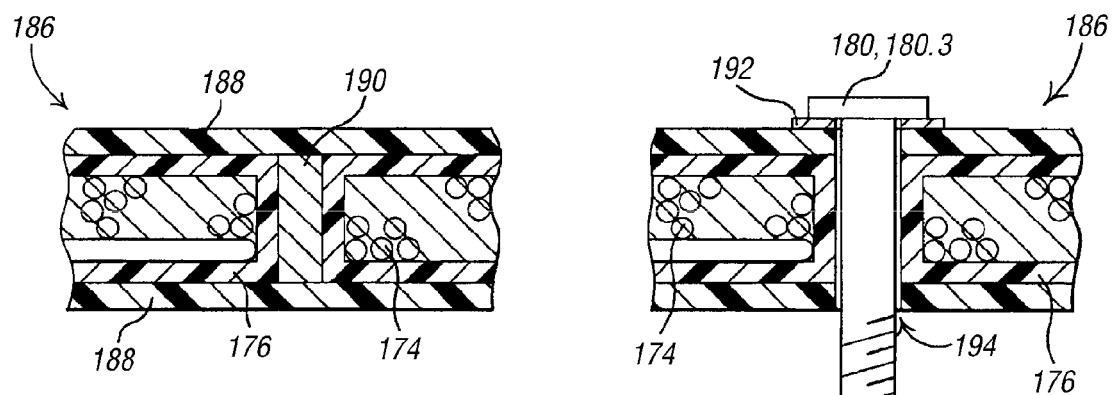
FIG. 14 illustrates a portion of a coil assembly incorporating a magnetically permeable core.
FIG. 15 illustrates a portion of a coil assembly adapted for mounting with a fastener.

Referring to FIG. 14, the gap coil assembly 186 can further comprise a core 190 of a material having relatively high magnetic permeability such as ferrite, mu-metal, or amorphous metal, e.g. METGLAS®.

The gap coil assemblies 186 illustrated in FIGS. 13 and 14 can be mounted, for example, by bonding or clamping. Referring to FIG. 15, the gap coil assembly 186 is mounted with a fastener 180, e.g. a cap screw 180.3 and washer 192, through a central mounting hole 194 in the spool 176. The material and dimensions of the fastener 180 would be selected according to the particular application. A material having relatively high magnetic permeability such as carbon steel or electrical steel could be used to concentrate the associated magnetic flux 40 through the gap coil 174, whereas a material of relatively low magnetic permeability such as aluminum, brass or stainless steel could be used to emulate an air core, thereby having less influence on the inherent flow of magnetic flux 40 across the associated gap 52 within which the gap coil assembly 186 is located.

Figure 16:
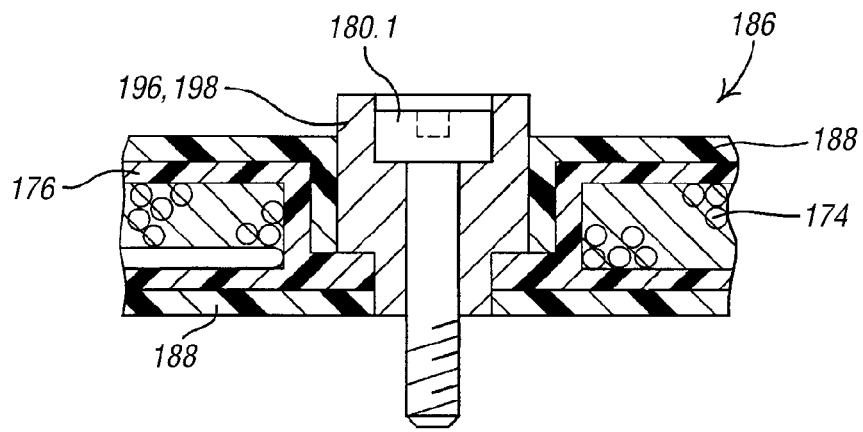
FIG. 16 illustrates a portion of a coil assembly adapted for mounting with a fastener, further comprising a magnetically permeable core.

Referring to FIG. 16, the gap coil assembly 186 is mounted with a fastener 180, e.g. a socket head screw 180.1, and further incorporates a magnetically permeable core 196 comprising a shouldered sleeve 198 that is recessed within the central mounting hole 194 in the spool 176. For example, the magnetically permeable core 196 can comprise either carbon steel, electrical steel, mu-metal, ferrite, or amorphous metal, e.g. METGLAS®. The length of the shouldered sleeve 198 can be adjusted in relation to the associated gap 52 in which the gap coil assembly 186 is mounted depending upon the extent of associated magnetic focusing required.

Figure 17:
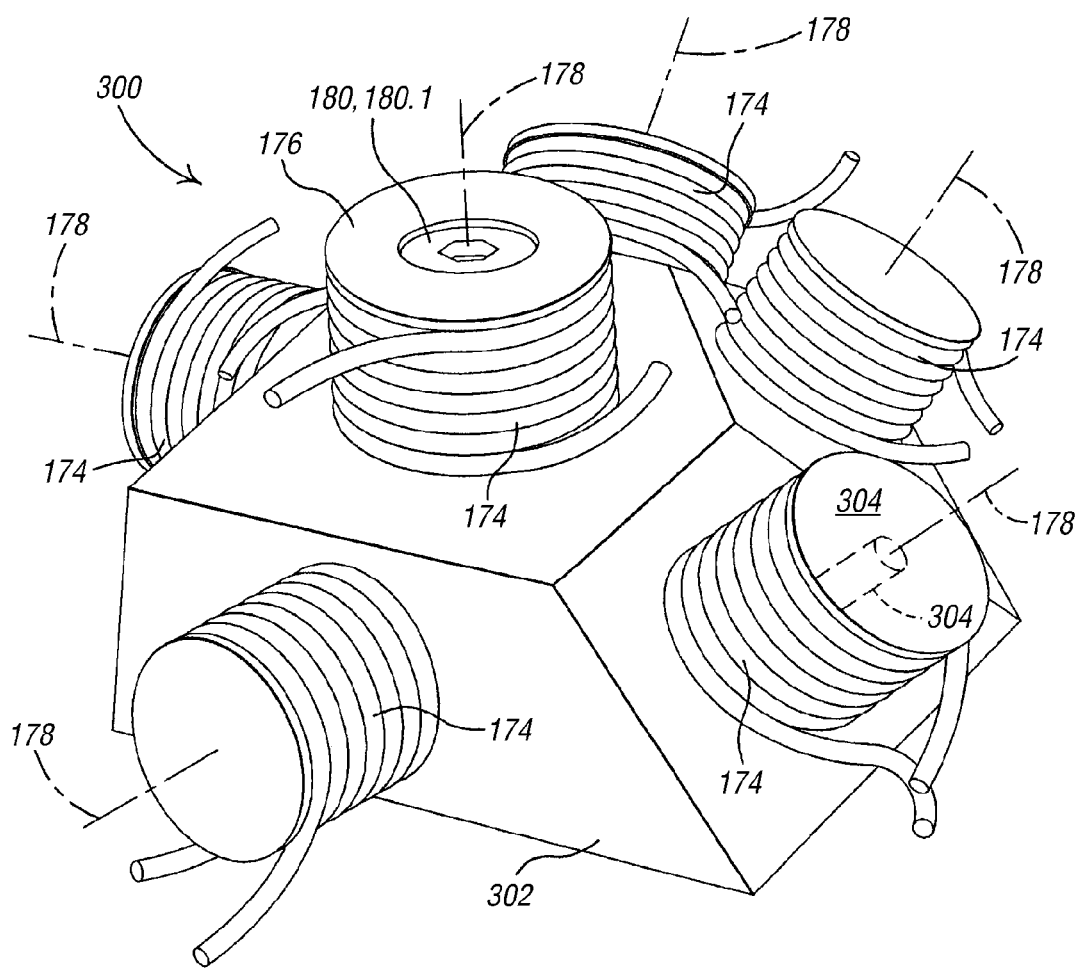
FIG. 17 illustrates a coil assembly comprising a plurality of coils arranged in a variety of orientations.
Figure 12:
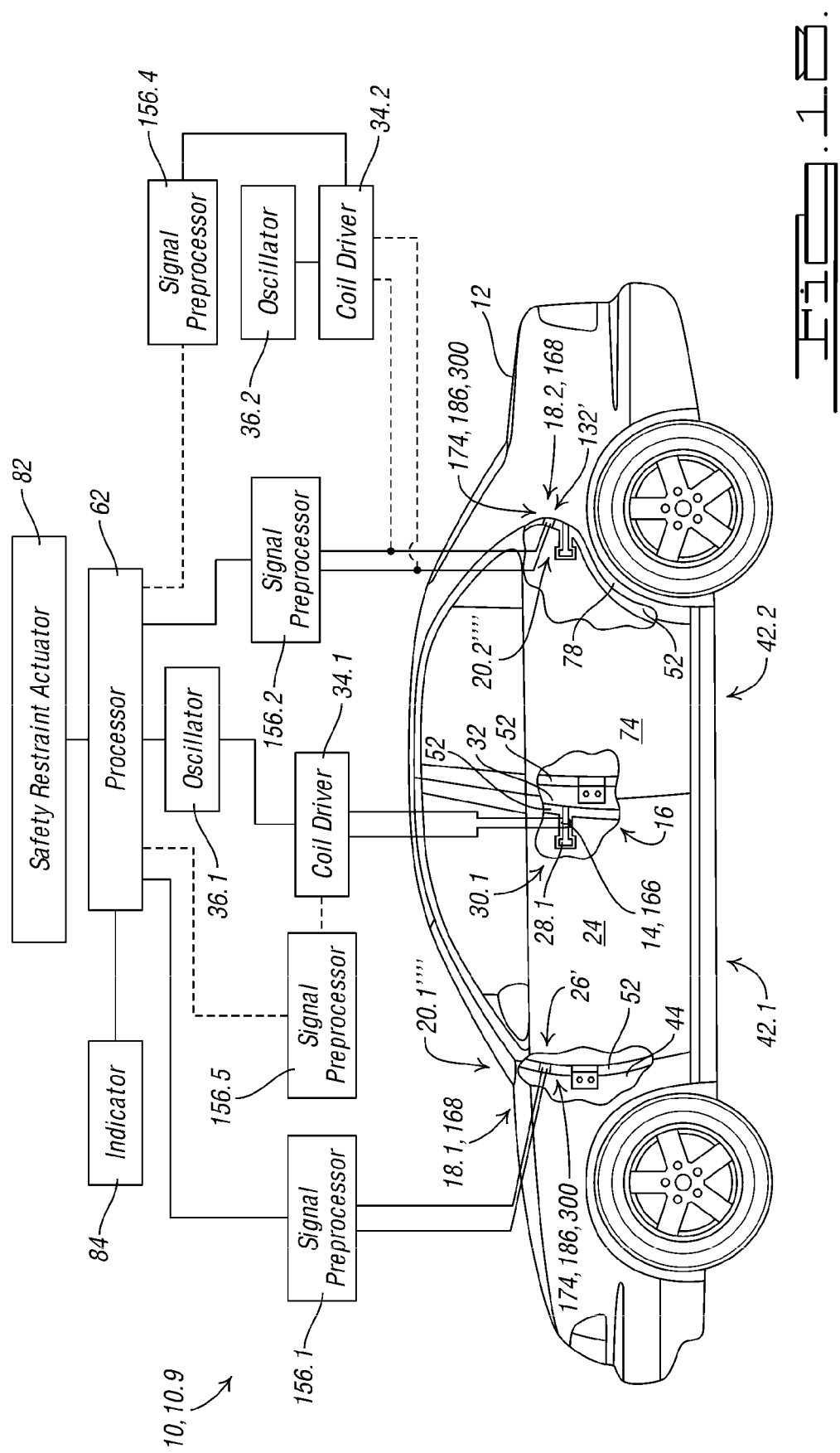

Referring to FIG. 17, a multi-axis gap coil assembly 300 comprises a plurality of gap coils 174 arranged on a central hub 302 wherein the axis 178 of each gap coil 174 is oriented in a different direction so as to provide for sensitivity to a corresponding component of the magnetic field 38 in that direction. The multi-axis gap coil assembly 300 is mounted with a fastener 180, e.g. a socket head screw 180.1, recessed in a spool 176 of one of the gap coils 174 and through the central hub 302. The individual gap coils 74 can be either preassembled and attached to the central hub 302, or wound around corresponding spool portions 304 that are attached to, or an integral part of, the central hub 302. For example, the central hub 302 and associated spool portions 304 could be plastic injection molded as a single part. The material used to construct the central hub 302 can be of relatively low magnetic permeability, e.g. plastic or aluminum, in applications for which the associated magnetic flux 40 need not be concentrated, and of a material of relatively higher magnetic permeability, e.g. ferrite, carbon steel, electrical steel or mu-metal, in applications for which it is beneficial to concentrate the associated magnetic flux 40 proximate to the associated gap coils 174. The multi-axis gap coil assembly 300 is illustrated with six gap coils 174, three oriented in orthogonal relation to one another, and the remaining three oriented obliquely relative thereto. It should be understood that this arrangement of gap coils 174 is principally to illustrate a variety of possible arrangements, and should not be taken to mean that the multi-axis gap coil assembly 300 must have that number of gap coils 174, or gap coils 174 arranged as so illustrated. More particularly, the multi-axis gap coil assembly 300 would have at least two gap coils 174 oriented with associated axes 178 thereof in different directions, so as to provide for multi-axis magnetic field sensitivity within a gap 52 between body elements of the vehicle 12.

Generally, the shape, size, gauge, and number of turns of a gap coil 174 is not limiting, but can instead be adapted or optimized for a particular application or configuration, e.g. the gap coil 174 can adapted to resonate at a particular frequency, to fit within a particular gap 52, or to influence the reluctance of the associated magnetic circuit 42.1, 42.2 in a particular way. For example, it has been beneficial to operate the gap coil 174 away from resonance so as to provide for a relatively flat frequency response thereof. The gap coil 174 can be developed and manufactured in accordance with any of a wide range of known coil design and manufacturing processes, and can be made small with any of a wide range of known connector and mounting configurations that would be selected or adapted for a particular mounting position and location in a given vehicle platform.

A plurality of individual gap coils 174 can be connected with a common cable harness that is adapted to provide for the placement of the individual gap coils 174 at the respective magnetic sensor locations with separation therebetween so as to provide for improved sensing coverage area and magnetic flux discrimination, thereby providing for safing, redundancy, and/or improved event discrimination at comparable or reduced cost relative to coils that must otherwise be adapted to conform to existing vehicle hardware, e.g. hinges 22, 72 or strikers 28.1, 28.1, 28.2. The gap coils 174 are beneficially small, self contained, easily mounted, and provide some level of redundancy in the associated magnetic crash sensing system. The gap coils 174 can be adapted to include proximate electrical components—e.g. resistors, capacitors, reference inductors, IC, amplifiers, A/D, etc.—if necessary to improve the function thereof.

Referring to FIG. 18, a ninth embodiment of a magnetic crash sensing system 10.9 is the same as the seventh embodiment 10.7 except for the magnetic sensors 18.1, 18.2, which in the ninth embodiment 10.9 are first 26' and second 132' gap coils located at corresponding second locations 20.1'''', 20.2'''' in the respective gaps 52 between the A-pillar 44 and the front door 24, and between the rear door 74 and the C-pillar 78 respectively, wherein the first 26' and second 32' gap coils are each in accordance with the gap coils 174, gap coil assemblies 186 or multi-axis gap coil assembly 300 as disclosed herein.

Figure 19:
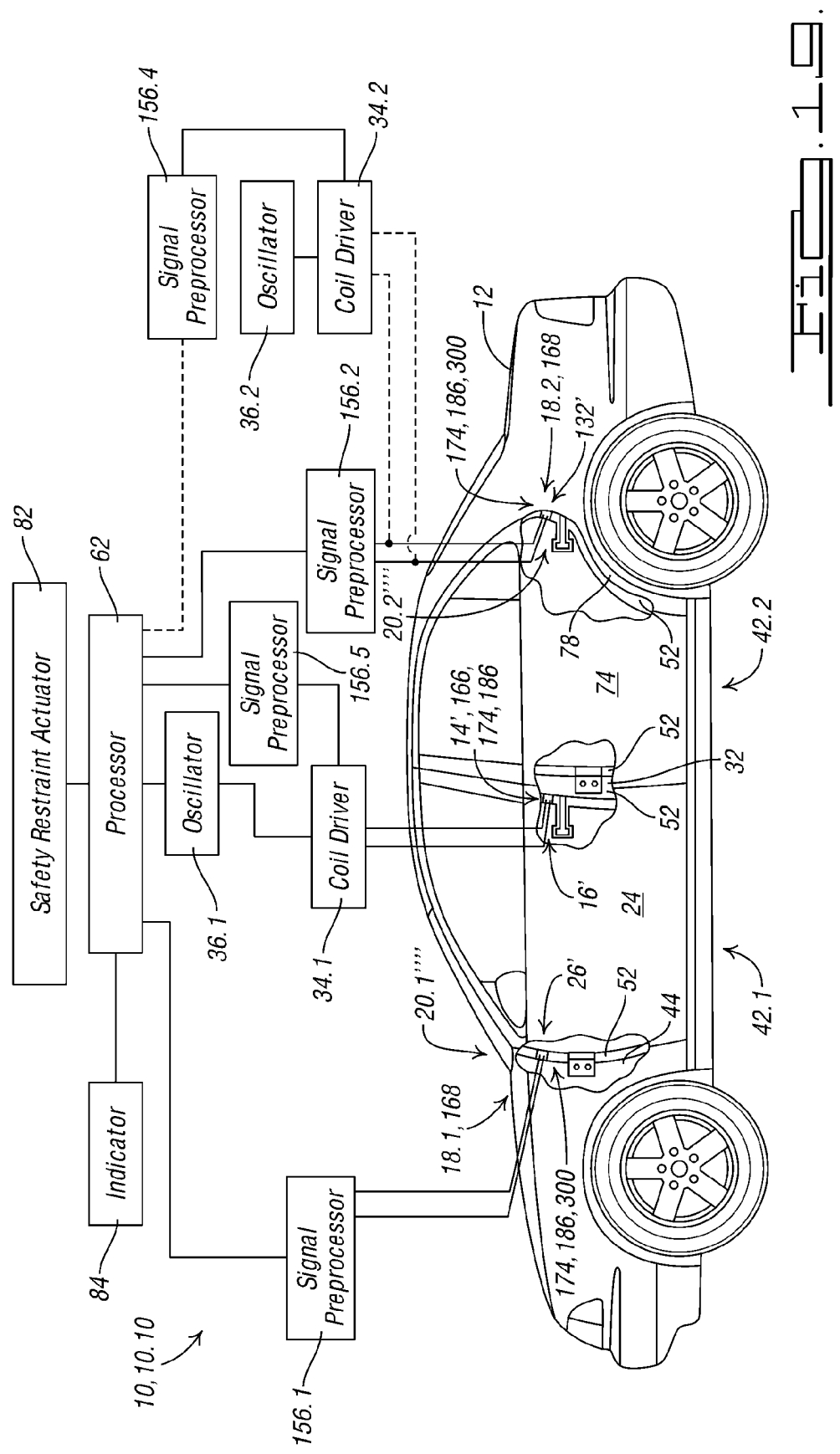
FIG. 19 illustrates a schematic block diagram of a tenth embodiment of a magnetic crash sensing system in a vehicle.

Referring to FIG. 19, a tenth embodiment of a magnetic crash sensing system 10.10 is the same as the ninth embodiment 10.9 except that the first coil 14 is replaced with a corresponding first coil 14' located at corresponding first location 16' in the respective gap 52 between the front door 24 and the B-pillar 32, wherein the first coil 14' is accordance with the gap coils 174, gap coil assemblies 186 or multi-axis gap coil assembly 300 as disclosed herein. Accordingly, the tenth embodiment of a magnetic crash sensing system 10.10 incorporates gap coils 174 throughout, the location of which in the associated gaps 52 is not otherwise constrained by existing vehicle hardware. The tenth embodiment of a magnetic crash sensing system 10.10 may be further adapted so that the coil driver 34.1 provides a measure of voltage across, current through, and/or power absorbed by the first coil 14', which is operatively coupled through a signal preprocessor 156.5 to the processor 62, for example, either so as to provide for magnetic crash sensing responsive to the self-inductance (or self-impedance) of the first coil 14', e.g. in accordance with the teachings of U.S. Pat. No. 6,587,048; or so as to provide for magnetic crash sensing using a time domain reflectometry technique, e.g. in accordance with the teachings of U.S. Pat. No. 6,583,616; each of which above referenced patents are incorporated in its entirety by reference herein.

Figures 20A, 20B:
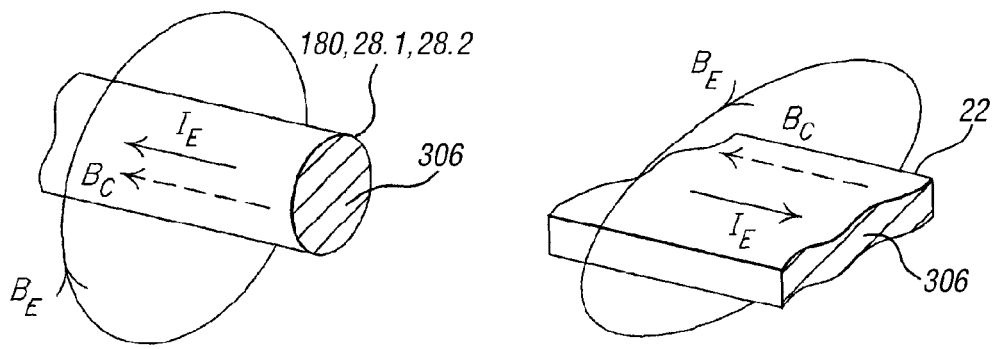
FIGS. 20a and 20b illustrate eddy currents, associated magnetic fields and axial magnetic fields in various ferromagnetic elements.
Figure 21:
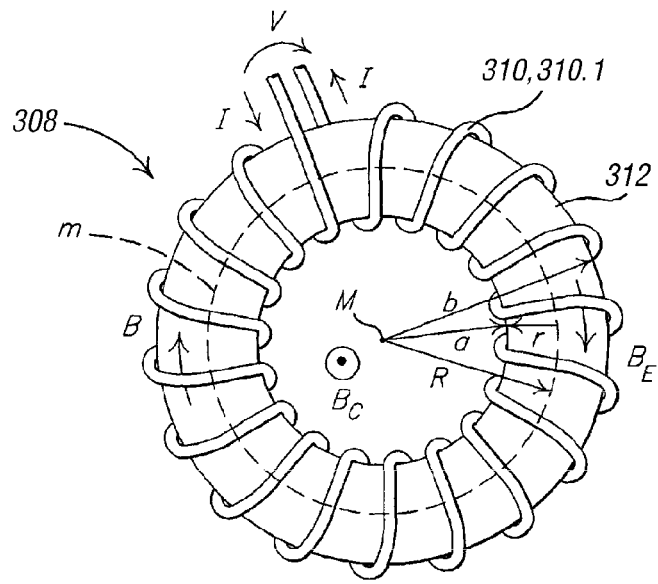
FIG. 21 illustrates a toroidal helical coil.
Figure 22:
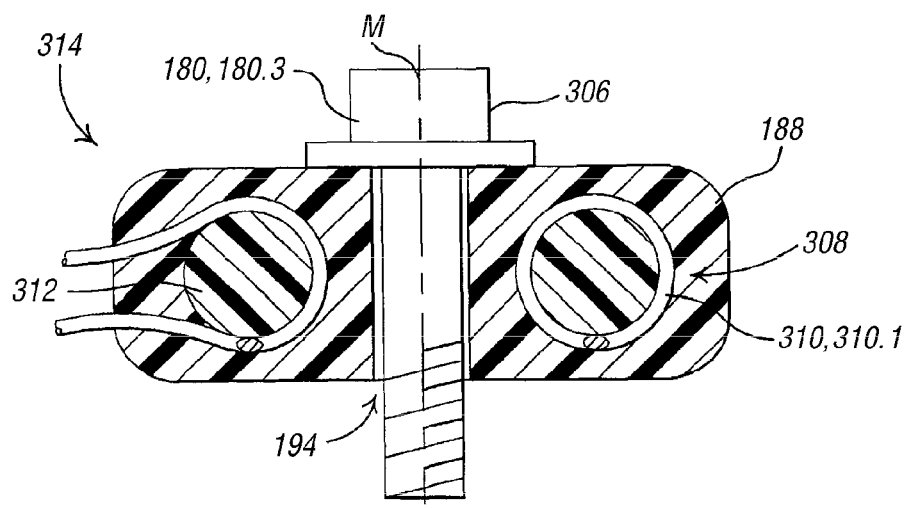
FIG. 22 illustrates a toroidal helical coil assembly.

Referring to FIGS. 20a and 20b, modeling and test results suggest that eddy currents $I_E$ are produced on the surface of steel pins or fasteners 180, strikers 28.1, 28.2, and hinges 22, 72, wherein the eddy currents $I_E$ oscillate longitudinally along the associated steel core 306, producing an associated circumferential magnetic field $B_E$ surrounding the axes of the associated steel core 306. Referring to FIGS. 21 and 22, a toroidal helical coil 308 provides for generating a voltage signal V responsive to the associated oscillating circumferential magnetic field $B_E$ in accordance with Faraday's Law, responsive to which an associated current signal I is generated when the toroidal helical coil 308 is connected to an associated circuit, e.g. a signal preprocessor 156.1, 156.2, 156.3. The toroidal helical coil 308 comprises a conductive path 310, e.g. a winding of conductive wire 310.1, e.g. copper or aluminum wire, around a toroidal core 312. Although the toroidal core 312 is illustrated in FIGS. 21 and 22 as having a circular shape (FIG. 21) and a uniform circular cross section (FIG. 22)—i.e. doughnut shaped—, in general the toroidal core 312 can have any closed shape with any cross-sectional shape, either uniform or not. For example, the toroidal core 312 could have a rectangular cross-section, similar to that of a washer. The toroidal core 312 comprises a major axis M and a minor axis m, wherein the conductive path 310 makes at least one turn around the minor axis m, and at least one turn around the major axis M. For example, in the embodiment illustrated in FIG. 21, the conductive path 310 makes a plurality of turns around the minor axis m, and a single turn around the major axis M. The at least one turn around the minor axis m provides for generating a component of the voltage signal V responsive to an oscillating circumferential magnetic field $B_E$, and the at least one turn around the major axis M provides for generating a component of the voltage signal V responsive to an oscillating axial magnetic field $B_C$, the latter of which is illustrated in FIGS. 20a and 20b. Accordingly, the toroidal helical coil 308 can be used to sense both axial $B_C$ and circumferential $B_E$ magnetic fields. The doughnut-shaped toroidal core 312 illustrated in FIGS. 21 and 22 comprises a major radius R, a minor radius r, and an associated outside b and inside a radii and a minor diameter 2r, and may be constructed of either a ferromagnetic or a non-ferromagnetic material, depending upon the application, i.e. whether or not it is necessary to concentrate circumferential magnetic flux within the toroidal core 312. Any of the above described magnetic sensors 18.1, 18.2, 18.3, 18.3', 18.3" may incorporate a toroidal helical coil 308 instead of or in addition to the associated coil 26, 132, 168, 174. For example, referring to FIG. 22, a toroidal helical coil assembly 314 comprises a toroidal helical coil 308 encapsulated in an encapsulant 188 about a central mounting hole 194 adapted to receive an associated fastener 180, e.g. a cap screw 180.3. The modeling and testing done with a toroidal helical coil 308 suggests that the eddy currents $I_E$ (and therefore the associated circumferential magnetic field $B_E$) are substantially enhanced when the steel core 306 associated with the toroidal helical coil 308 is electrically connected to the front 24 or rear 74 doors and/or the vehicle frame, whereby an electrical connection to both, e.g. via a hinge 22, 72, is beneficial. Tests have indicated that a stronger signal may be obtained when using a toroidal helical coil 308 instead of a circular wound gap coil 174 at a location otherwise suitable for a gap coil assembly 186.

While specific embodiments have been described in detail, those with ordinary skill in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims and any and all equivalents thereof.

What is claimed is:

1. A method of sensing a magnetic condition of a door of a vehicle, comprising:
   a. locating at least one first coil at at least one first location in magnetic communication with a first door of the vehicle;
   b. applying at least one first time-varying signal to said at least one first coil;
   c. generating at least one first magnetic field with said at least one first coil responsive to said at least one first time-varying signal, wherein at least a portion of said at least one first magnetic field is in magnetic communication with said first door, said at least one first location and said at least one first coil are adapted so that said at least one first magnetic field is influenced by an opening state of said first door, and said at least one first location and said at least one first coil are adapted so that said at least one first magnetic field is influenced by a crash involving said first door; and
   d. generating at least one first signal from said at least one first coil responsive to said at least one first time-varying electrical signal and responsive to at least said at least one first magnetic field, wherein said at least one first signal provides for sensing an opening state of said first door, and said at least one first signal provides for sensing a crash involving said first door.

2. A method of sensing a magnetic condition of a door of a vehicle as recited in claim 1, wherein said at least one first magnetic field provides both for sensing said opening state of said first door and for sensing said crash involving said first door.

3. A method of sensing a magnetic condition of a door of a vehicle as recited in claim 1, wherein said at least one first signal is responsive to a self-impedance of said at least one first coil.

4. A method of sensing a magnetic condition of a door of a vehicle as recited in claim 3, wherein said at least one first signal is responsive to a self-inductance of said at least one first coil.

5. A method of sensing a magnetic condition of a door of a vehicle as recited in claim 3, wherein said at least one first signal comprises a first signal component that is substantially in-phase with respect to said at least one first time-varying signal.

6. A method of sensing a magnetic condition of a door of a vehicle as recited in claim 5, wherein said first signal component is responsive to at least one eddy current induced in at least a portion of said first door by said at least one first magnetic field.

7. A method of sensing a magnetic condition of a door of a vehicle as recited in claim 1, wherein said at least one first time-varying signal is applied in a burst mode so as to conserve power.

8. A method of sensing a magnetic condition of a door of a vehicle as recited in claim 6, wherein said at least one first time-varying signal is applied for a sufficient number of consecutive cycles so as to provide for a detection of said at least one first signal, followed by a substantial dwell period.

9. A method of sensing a magnetic condition of a door of a vehicle as recited in claim 7, wherein a length of said dwell period is adapted so that a duty cycle of said at least one first time-varying signal is less than 0.1 percent.

10. A method of sensing a magnetic condition of a door of a vehicle as recited in claim 7, wherein said at least one first time-varying signal is applied to said at least one first coil even when said vehicle is in a quiescent state.

11. A method of sensing a magnetic condition of a door of a vehicle as recited in claim 1, further comprising:
   a. locating at least one second coil at a corresponding at least one second location in magnetic communication with said first door;
   b. applying at least one second time-varying signal to said at least one second coil; and
   c. generating at least one second magnetic field with said at least one second coil responsive to said at least one second time-varying signal, wherein at least a portion of said at least one second magnetic field is in magnetic communication with said first door, said first and second locations and said at least one first and second coils are adapted so that said at least one second magnetic field is influenced by a crash involving said first door, wherein said at least one first signal comprises at least one first component and at least one second component, said at least one first component of said at least one first signal is responsive to said at least one first time-varying electrical signal and responsive to said at least one first magnetic field, and provides for sensing said opening state of said first door, and said at least one second component of said at least one first signal is responsive to said at least one second magnetic field, and provides for sensing said crash involving said first door.

12. A method of sensing a magnetic condition of a door of a vehicle as recited in claim 11, wherein said first and second time-varying signals are operated mutually exclusively in time.

13. A method of sensing a magnetic condition of a door of a vehicle as recited in claim 11, wherein said first and second time-varying signals are operated at different frequencies.

14. A method of sensing a magnetic condition of a door of a vehicle as recited in claim 1, wherein said at least one first location is proximate to a first pillar of the vehicle, wherein an edge of said first door is adapted to swing away from said pillar when said first door is opened.

15. A method of sensing a magnetic condition of a door of a vehicle as recited in claim 14, further comprising a first control operation comprising controlling at least a first safety restraint actuator of said vehicle responsive to said at least one first signal.

16. A method of sensing a magnetic condition of a door of a vehicle as recited in claim 15, further comprising:
   a. locating at least third coil at at least one third location in magnetic communication with a second door of said vehicle, wherein said at least one third location is proximate to a second pillar of said vehicle, wherein an edge of said second door is adapted to swing away from said pillar when said second door is opened, and said first and second doors are on a same side of said vehicle
   b. applying at least one third time-varying signal to said at least one third coil;
   c. generating at least one third magnetic field with said at least one third coil responsive to said at least one third time-varying signal, wherein at least a portion of said at least one third magnetic field is in magnetic communication with said second door, said at least one third location and said at least one third coil are adapted so that said at least one third magnetic field is influenced by an opening state of said second door, and said at least one third location and said at least one third coil are adapted so that said at least one third magnetic field is influenced by a crash involving said second door;
   d. generating at least one second signal from said at least one third coil responsive to said at least one third time-varying electrical signal and responsive to at least said at least one third magnetic field, wherein said at least one second signal provides for sensing an opening state of said second door, and said at least one second signal provides for sensing a crash involving said second door;
   e. a second control operation comprising controlling at least one of said first or another safety restraint actuator of said vehicle responsive to said at least one second signal;
   f. safing said first control operation responsive to said at least one second signal, and
   g. safing the control of said second control operation responsive to said at least one first signal.

17. A method of sensing a magnetic condition of a door of a vehicle as recited in claim 15, further comprising sensing an acceleration of the vehicle at a location in or proximate to said first door, and safing said first control operation responsive to the operation of sensing said acceleration of said vehicle at said location in or proximate to said first door.

18. A method of sensing a magnetic condition of a door of a vehicle as recited in claim 15, further comprising:
   a. locating at least fourth coil at at least one fourth location in magnetic communication with said first door of said vehicle, wherein said at least one fourth location is proximate to said first pillar of said vehicle;
   b. applying at least one fourth time-varying signal to said at least one fourth coil;
   c. generating at least one fourth magnetic field with said at least one fourth coil responsive to said at least one fourth time-varying signal, wherein at least a portion of said at least one fourth magnetic field is in magnetic communication with said first door, and said at least one fourth location and said at least one fourth coil are adapted so that said at least one fourth magnetic field is influenced by an opening state of said first door;
   d. generating at least one third signal from said at least one fourth coil responsive to said at least one fourth time-varying electrical signal and responsive to at least said at least one fourth magnetic field, wherein said at least one third signal provides for sensing an opening state of said first door; and
   e. safing said first control operation responsive to said at least one third signal.

19. A method of sensing a magnetic condition of a door of a vehicle as recited in claim 1, further comprising adjusting at least one detection threshold for sensing said opening state of said first door when said first door is in at least one known state of opening.

20. A method of sensing a magnetic condition of a door of a vehicle as recited in claim 1, further comprising controlling an actuation of an interior light of said vehicle response to said at least one first signal.

21. A method of sensing a magnetic condition of a door of a vehicle as recited in claim 1, further comprising communicating said at least one first signal to a vehicle security system.

* * * * *